US007631677B2

(12) United States Patent
Chojnacki

(10) Patent No.: US 7,631,677 B2
(45) **Date of Patent: *Dec. 15, 2009**

(54) SYNCHRONIZED CENTRAL STAMP APPLICATOR MACHINE AND METHOD OF OPERATING THE SAME

(75) Inventor: Andrzej Chojnacki, Alden, NY (US)

(73) Assignee: Illinois Tool Works Inc., Glenview, IL (US)

( * ) Notice: Subject to any disclaimer, the term of this patent is extended or adjusted under 35 U.S.C. 154(b) by 466 days.

This patent is subject to a terminal disclaimer.

(21) Appl. No.: 10/408,639

(22) Filed: Apr. 7, 2003

(65) Prior Publication Data

US 2004/0045660 A1 Mar. 11, 2004

Related U.S. Application Data

(63) Continuation-in-part of application No. 10/246,277, filed on Sep. 18, 2002, now Pat. No. 7,568,511.

(60) Provisional application No. 60/409,129, filed on Sep. 9, 2002.

(51) Int. Cl.

| | |
|---|---|
| ***B32B 39/00*** | (2006.01) |
| ***B32B 41/00*** | (2006.01) |
| ***B65C 9/06*** | (2006.01) |
| ***B65C 9/18*** | (2006.01) |

(52) U.S. Cl. ................. 156/363; 156/541; 156/DIG. 2; 156/DIG. 3; 156/DIG. 4; 53/504; 53/382.1; 53/383.1

(58) Field of Classification Search ..................... 53/52, 53/75, 382.1, 493, 504, 383.1; 156/64, 350, 156/351, 360, 367, 378, 443, 538–541, 556, 156/DIG. 3, DIG. 4, DIG. 27, DIG. 37, 250, 156/363

See application file for complete search history.

(56) References Cited

U.S. PATENT DOCUMENTS

| | | | | |
|---|---|---|---|---|
| 2,216,884 | A * | 10/1940 | Kott | 53/127 |
| 3,763,557 | A | 10/1973 | Sewell | |
| 4,265,355 | A | 5/1981 | Davis | |
| 4,589,943 | A * | 5/1986 | Kimball et al. | 156/256 |
| 4,664,740 | A | 5/1987 | Wilkinson | |
| 4,969,305 | A | 11/1990 | York et al. | |
| 5,168,883 | A | 12/1992 | Winn | |
| 5,788,114 | A * | 8/1998 | Perego | 221/11 |
| 6,013,148 | A * | 1/2000 | Bluemle | 156/159 |

* cited by examiner

*Primary Examiner*—Philip C Tucker
*Assistant Examiner*—Sing P Chan
(74) *Attorney, Agent, or Firm*—Law Offices of Steven W. Weinrieb

(57) ABSTRACT

Apparatus and method for applying tax stamps to individual cigarette packages of different cigarette cartons having different height dimensions comprises cigarette carton unsealing and opening stations, a cigarette package tax stamp application station, and cigarette carton closing and re-sealing stations. A pair of plow mechanisms are disposed at the cigarette carton opening station, which comprises a two-stage cigarette carton opening station, so as to ensure the opening of each top flap member of each cigarette carton. In addition, a waxed tax stamp paper roll disposed at the tax stamp application station is indexably movable with respect to the stamping iron of the tax stamp application station so as to always ensure that the tax stamps are applied to central portions of each cigarette package of each cigarette carton indexably moved to the tax stamp application station.

11 Claims, 12 Drawing Sheets

SYNCHRONIZED CENTRAL STAMP APPLICATOR MACHINE AND METHOD OF OPERATING THE SAME

CROSS-REFERENCE TO RELATED PATENT APPLICATIONS

This patent application is a Continuation-in-Part (CIP) of U.S. patent application Ser. No. 10/246,277 now U.S. Pat. No. 7,568,511, which is entitled SYNCHRONIZED STAMP APPLICATOR MACHINE AND METHOD OF OPERATING THE SAME, which was filed on Sep. 18, 2002 in the name of Chojnacki et al., and which, in turn, is based upon provisional patent application No. 60/409,129 which was filed on Sep. 9, 2002.

FIELD OF THE INVENTION

The present invention relates generally to apparatus, machines, or systems for applying, for example, tax stamps to individual packages of cigarettes contained within a carton of cigarettes, and more particularly to a new and improved machine, apparatus, or system, and a method of operating the same, for applying tax stamps to individual packages of cigarettes contained within a carton of cigarettes wherein the machine, apparatus, or system is capable of automatically handling differently sized cartons of cigarettes, comprising different brands of cigarettes produced by different cigarette manufacturers, as a result of the mechanisms comprising the cigarette carton opening station, the cigarette package stamping station, and the cigarette carton closing station being automatically adjustable, and wherein further, in accordance with the particularly unique and novel characteristics of the present invention, the mechanism disposed at the cigarette carton opening station ensures the proper individual opening of each one of the relatively large, outer carton flaps, as well as each one of the relatively small, inner carton flaps, without damaging the carton flaps or the cigarette cartons per se, while the mechanism disposed at the cigarette package stamping station ensures the proper and complete stamping of each package of cigarettes at a centralized position of each cigarette package.

BACKGROUND OF THE INVENTION

Machines, apparatus, or systems for applying, for example, tax stamps to individual packages of cigarettes, contained within a carton of cigarettes, are known in the art. An example of one such machine, apparatus, or system is disclosed within U.S. Pat. No. 4,265,355 which issued to Davis on May 5, 1981. In-accordance with the operative structure comprising the disclosed machine, apparatus, or system, cartons of cigarettes are transported or conveyed by means of an infeed conveyor to an input platform or table, and subsequently, the cartons of cigarettes are further conveyed, moved, or routed through a carton separating stage, a carton flap opening stage, a carton flap fold-back stage, a cigarette package stamping stage, and a carton flap regleueing stage. If cartons having different length, different width, and/or different height dimensions are to be processed, various structural components or mechanisms comprising the various aforenoted cigarette carton and package processing stages or stations must be adjusted so as to in fact enable the machine, apparatus, or system to accommodate and process the cartons having such different length, width, and height dimensions. Unfortunately, in accordance with the structural arrangement or construction comprising the various interactive or interoperative components of the aforenoted machine, apparatus, or system of Davis, the adjustable structural components or mechanisms must be manually adjusted which is very time-consuming and tedious for operator personnel. As can therefore be readily appreciated, the throughput processing speed of the machine, apparatus, or system is relatively slow, and the throughput processing or output volume of the machine, apparatus, or system is relatively low.

In order to effectively improve upon the processing of differently-sized cigarette cartons within the aforenoted Davis machine or apparatus, the system of Michalski, as disclosed within U.S. patent application Ser. No. 10/037,386, which was filed on Dec. 21, 2001 and which is entitled LINEAR STAMP APPLICATOR MACHINE AND METHOD OF OPERATING THE SAME, was developed. Briefly, in accordance with the apparatus or system of Michalski, a sensing mechanism is disposed at a first station located at the upstream end portion of the machine or system whereby, for example, the height dimension of each cigarette carton is determined and the height dimension data, reflective of each individual cigarette carton, is transmitted to a program logic controller (PLC). The subsequent processing stations, located downstream from the first upstream cigarette carton sensing and height determination station, comprise appropriate operative components or means, for example, for opening the cigarette cartons, for stamping the individual cigarette packages contained within each cigarette carton, and for closing and resealing the cigarette cartons after the stamps have been applied to all of the cigarette packages within the cigarette cartons. In addition, suitable servo mechanisms are operatively associated with the particular operative components disposed at each one of the processing stations, and accordingly, when the program logic controller (PLC) transmits suitable data, indicative of the height dimensions characteristic of each particular cigarette carton, to each one of the servo mechanisms, the servo mechanisms adjust the respective operative components disposed at the processing stations such that the station components are optimally positioned with respect to the particular cigarette carton disposed at the particular processing station in order to permit the particular operative components to properly perform their particular operation upon the cigarette carton or packages.

While the system of Michalski has been commercially successful, it was determined that further improvements needed to be implemented in connection with such a system in order to, for example, render the same operatively more efficient whereby the throughput processing volume can be increased, and in addition, the overall structural arrangement of the system can be simplified and rendered more economical. For example, it has been noted that, in accordance with the system of Michalski, each individual cigarette carton needs to have its height dimension determined regardless of the fact, for example, that the particular carton of cigarettes may comprise one of several cartons of cigarettes of the same type or brand of cigarettes manufactured by the same manufacturer whereby all of the cigarette cartons will in effect have the same height dimension. In addition, as has been noted, each one of the cigarette carton opening, cigarette package stamping, and cigarette carton closing and re-sealing stations must have its own servo mechanism operatively disposed at each particular operational station, for receiving the height dimension data, which is characteristic of each cigarette carton and which has been previously entered into the memory of the program logic controller (PLC), so as to respectively control the disposition of the particular operational mechanism, located at such station, with respect to each incoming cigarette carton whereby each operation mechanism may properly perform its particular operation with respect to the particular cigarette carton.

Still further, in order to initially open the sealed cigarette cartons, the cigarette cartons are conveyed through a cigarette carton opening station at which a plow mechanism is disposed. Roller members are disposed immediately upstream of the plow mechanism so as to effectively squeeze the side portions of the cigarette carton together and thereby cause the top flaps of the carton to effectively assume a substantially "domed" configuration into which the plow mechanism can be moved so as to subsequently forcefully separate and open the bonded top carton flaps with respect to each other. It sometimes occurs, however, due, for example, to different stiffness parameters characteristic of different cigarette cartons, that the "domed" configuration is not always properly or sufficiently formed so as to in fact permit the plow mechanism to be properly inserted into the space defined beneath the bonded top carton flaps. At other times, the plow mechanism may in fact be properly inserted into the space defined beneath the upwardly "domed" top carton flaps, however, the adhesive bonding force defined between the top carton flaps is sometimes greater than the tear resistance defined between the top carton flaps and the remainder of the cigarette carton. Accordingly, upon insertion of the plow mechanism into the space defined beneath the upwardly "domed" top carton flaps, one or both of the top carton flaps is or are torn away from the remainder of the cigarette carton in lieu of the top carton flaps being properly separated and opened with respect to each other. This may also cause the processing line to become jammed which would, in turn, impact the throughput processing and volume capabilities of the stamp applicator machine or system.

Accordingly, as a result of the development of the invention as disclosed within the aforenoted U.S. patent application Ser. No. 10/246,277, which is entitled SYNCHRONIZED STAMP APPLICATOR MACHINE AND METHOD OF OPERATING THE SAME, and which was filed on Sep. 18, 2002 in the name of Chojnacki et al., a new and improved machine, apparatus, or system for applying tax stamps to individual packages of cigarettes contained within a carton of cigarettes was developed wherein the various interactive or interoperative components of the machine, apparatus, or system which comprise, or are positioned at, for example, the carton flap opening station, the cigarette package stamping station, and the carton flap closing station, were able to be automatically adjusted by means of a single servo unit such that the machine, apparatus, or system was rendered more economical to construct and implement, wherein there was no longer a need to necessarily scan each incoming cigarette carton for its particular size or height dimension whereby the throughput processing speed of the machine, apparatus, or system was enhanced, wherein the opening operations performed upon the cigarette cartons were substantially simplified, optimized, and reliably ensured, and wherein further, means for accessing the various components of the machine or apparatus were provided such that jamming of the machine, apparatus, or system, at any particular operation station, could be readily rectified such that the throughput processing or output volume of the machine, apparatus, or system would not be adversely affected and was in fact enhanced as compared to conventional stamp applicator machines.

While the system of Chojnacki et al. has therefore likewise been commercially successful, it has been determined still further that further improvements need to be implemented in connection with such a system in order to, for example, render the same operatively more efficient, as well as universally more adaptable and reliable with respect to the various different types of cigarette cartons manufactured by various different cigarette manufacturing companies, whereby, again, the proper and accurate stamping of the cigarette packages can be achieved, the cigarette cartons can be properly opened without incurring any damage thereto or without causing any jamming of the apparatus or system, and wherein the throughput processing volume can be substantially increased. As disclosed within the aforenoted patent application to Chojnacki et al., cigarette packages are conventionally disposed within cigarette cartons in groups of ten packages, wherein the ten cigarette packages are arranged within two rows, each row comprising five cigarette packages. Tax stamps are provided as thermally activated waxed impressions upon a supply roll of waxed tax stamp paper, and are arranged within transversely extending rows with each row of tax stamps comprising fifteen tax stamps. A stamping iron is disposed at a tax stamp application station, and comprises, for example, five longitudinally spaced stamping iron shoes. The stamping iron is adapted to be moved into contact with the thermally activatable tax stamps, disposed upon the supply roll of waxed tax stamp paper, and thermally energized in a time-controlled manner so as to effectively transfer the waxed tax stamps, from the supply roll of waxed tax stamp paper onto the upper surface portions of the individual cigarette packages contained within each cigarette carton, when the individual thermally energized stamping iron shoes come into contact with the waxed tax stamps, thereby effectively melting and transferring the same.

It is to be appreciated still further, that in order for the five longitudinally spaced stamping iron shoes of the stamping iron to effectively encounter and transfer all of the fifteen waxed tax stamps disposed within each row of waxed tax stamps disposed upon the supply roll of waxed tax stamp paper, the stamping iron must be indexable between three predetermined longitudinally spaced positions. Accordingly, when the stamping iron is disposed at its first longitudinal position in preparation for the transfer of waxed tax stamps from the waxed tax stamp paper onto the cigarette packages disposed within a first cigarette carton disposed at the tax stamp application station, the five stamping iron shoes will effectively thermally engage those waxed tax stamps which are disposed within particular rows of waxed tax stamps upon the waxed tax stamp paper and which are located at the first, fourth, seventh, tenth, and thirteenth positions of the fifteen waxed tax stamp positions comprising each row of waxed tax stamps. Subsequently, after the cigarette packages of the first cigarette carton have had the tax stamps applied thereto, the first cigarette carton is conveyed downstream from the tax stamp application station to a successive station for further processing, while a second cigarette carton is moved into the tax stamp application station.

In conjunction with the movement of the second cigarette carton to the tax stamp application station, the stamping iron is indexably moved to its second predetermined longitudinal position whereby the five stamping iron shoes will now be able to effectively thermally engage those waxed tax stamps which are disposed within the same rows of waxed tax stamps upon the waxed tax stamp paper but which are now located at the second, fifth, eighth, eleventh, and fourteenth positions of the fifteen waxed tax stamp positions comprising each row of waxed tax stamps. In a similar manner, after the cigarette packages of the second cigarette carton have had the tax stamps applied thereto, the second cigarette carton is conveyed downstream from the tax stamp application station for further processing, while a third cigarette carton is moved into the tax stamp application station. In conjunction with the movement of the third cigarette carton to the tax stamp application station, the stamping iron is indexably moved to its third predetermined longitudinal position whereby the five stamping iron shoes will now be able to effectively thermally engage those waxed tax stamps which are disposed within the same rows of waxed tax stamps upon the waxed tax stamp paper but which are now located at the third, sixth, ninth, twelfth, and fifteenth positions of the fifteen waxed tax stamp positions comprising each row of waxed tax stamps.

It is to be appreciated that in view of the fact that all of the cigarette cartons are fixedly disposed at the same position within the tax stamp application station during a tax stamp application procedure, and in view of the additional fact that the waxed tax stamp paper, having the tax stamps disposed thereon for transfer onto the cigarette packages of one of the cigarette cartons, is also fixedly disposed at a particular position within the tax stamp application station during the tax stamp application procedure, then it is to be appreciated further that the indexable movement of the stamping iron to any one of its three positions effectively moves the stamping iron with respect to any fixed position of the tax stamp application station. Accordingly, and more importantly, it can be readily appreciated that the indexable movement of the stamping iron to any one of its three positions effectively alters the relative disposition of the stamping iron with respect to the cigarette cartons disposed at the tax stamp application station, all of which are, as has been noted, disposed at the same predetermined position within the tax stamp application station. Therefore, it can be appreciated still further that when the stamping iron is disposed at its first indexable position with respect to the tax stamp application station, the tax stamps will actually be deposited upon a first longitudinal end portion of each cigarette package, whereas when the stamping iron is disposed at its second indexable position with respect to the tax stamp application station, the tax stamps will be deposited at a substantially central portion of each cigarette package, whereas, lastly, when the stamping iron is disposed at its third indexable position with respect to the tax stamp application station, the tax stamps will actually be deposited upon a second opposite longitudinal end portion of each cigarette package.

It can therefore be appreciated still further that this mode of operation, of controlling the relative disposition of the stamping iron and the stamping iron shoes thereof, with respect to the waxed tax stamp paper and the individual cigarette packages of the cigarette cartons, can pose potential operative problems. More particularly, it has been noted that different cigarette manufacturing companies produce different cigarette cartons, having different sized cigarette packages disposed therein, which are characterized by different external dimensions. Accordingly, as a result of these differences in size dimensions of the cigarette cartons, as functions of the particular cigarette manufacturer, when the differently sized cigarette cartons are disposed at the tax stamp application station, it has in fact been experienced that the stamping iron shoes will effectively be offset from their previously desired or predetermined positions with respect to the cigarette packages when the stamping iron is disposed at either one of its extreme or end positions, that is, its first and third positions. Therefore, when the tax stamps are in fact transferred from the waxed tax stamp paper onto the cigarette packages, the tax stamps are not always fully imprinted upon the cigarette packages but only partially imprinted upon the cigarette packages. This phenomenon is known as “chop-off”. More particularly, while an entire tax stamp is in fact thermally melted and transferred from the waxed tax stamp paper toward the cigarette packages, only approximately one half of each tax stamp may actually be imprinted onto a particularly designated cigarette package, the other half of the tax stamp either not being imprinted at all upon any cigarette package or being imprinted upon an improper portion of an adjacent cigarette package.

Continuing further, in addition to the aforenoted logistics problem in connection with the proper disposition of the stamping iron, and the proper transfer and imprinting of the waxed tax stamps onto the cigarette packages of each cigarette carton, due to the differing size dimensions of the various cigarette packages and cigarette cartons, the differing size dimensions of the various cigarette packages poses additional operational problems. As noted within the aforenoted United States patent application to Chojnacki et al., specifically constructed implements or mechanisms have been employed in order to ensure, as best as possible, that the flaps of each cigarette carton are properly opened in preparation for the implementation of the tax stamp application procedures. More particularly, as disclosed within the aforenoted Chojnacki et al. patent application, the apparatus or machine comprises, for example, suction means for initially engaging the larger, outer flap member of each cigarette carton so as to effectively cause the larger, outer carton flap member, which is adhesively bonded to the smaller, inner flap member, to be lifted upwardly an amount which is sufficient enough so as to permit a cutter blade mechanism to be effectively interposed between the larger, outer and smaller, inner carton flap members and thereby sever the adhesive bond therebetween. As a result of the severance of the adhesive bond defined between the carton flap members, the carton flap members tend to automatically move upwardly a sufficient amount which enables a suitable plow mechanism to be inserted beneath the carton flap members so as to move the carton flap members from their substantially overlapped disposition with respect to each other to fully OPENED positions at which the carton flap members extend away from the cigarette carton in opposite directions with respect to each other.

While the aforenoted unsealing and opening of the cigarette cartons normally occurs, in connection with most of the cigarette cartons currently manufactured, in accordance with the aforenoted procedures, the multitude of commercially available cigarette cartons, manufactured by different companies according to different specifications, or wherein the cigarette cartons have the aforenoted varying dimensional characteristics, has in fact presented operational problems which have in effect prevented the apparatus or system of, for example, Chojnacki et al., from operating in accordance with its optimal design parameters. For example, due to the differences in the cigarette carton manufacturing techniques or specifications, it sometimes happens that the fold lines, defined between the cigarette carton flap members and the upstanding side wall members of the cigarette cartons, are not properly or sufficiently scored so as to permit the carton flap members to effectively automatically open the aforenoted sufficient amount with respect to each other in order to permit the introduction of the plow mechanism beneath the carton flap members so as to cause the carton flap members to be moved to their fully OPENED positions with respect to each other and with respect to the cigarette carton. In such a case, the plow mechanism might actually encounter or engage the carton flap members per se directly whereupon relative movement between the cigarette carton and the plow mechanism, the carton flap members, and side wall portions of the cigarette carton, may be undesirably damaged.

Alternatively, it sometimes occurs that the size dimensions of the individual cigarette packages do not correspond sufficiently with the size dimensions of the cigarette cartons whereby, when the cigarette packages are disposed internally within the cigarette cartons, the upper surface portions of the cigarette packages are disposed at an elevational level which is beneath the fold lines defined between the cigarette carton flap members and the upstanding side wall members of the cigarette cartons. Accordingly, when the carton flap members are folded inwardly so as to achieve their relative overlapped dispositions with respect to each other and with respect to the cigarette carton, it sometimes occurs that the free or distal end portion of the smaller inner carton flap, which is remote from the proximal end portion which is attached to the cigarette carton at the scored fold line, is disposed atop the upper surface portions of the cigarette packages and is beneath the elevational level at which the scored fold lines are defined. Therefore, when the adhesive bond defined between the carton flap members is unsealed, and the carton flap members are adapted to be opened with respect to each other, the smaller, inner flap member sometimes remains at its position internally within the cigarette carton and atop the cigarette packages. Consequently, when the cigarette carton is moved to the processing station at which the plow mechanism is adapted to be inserted beneath the carton flap members in order to move the carton flap members to their fully OPENED position, the plow mechanism will not in fact be capable of being inserted beneath the smaller, inner carton flap member whereby, again, the carton flap members, and side wall portions of the cigarette carton, may be undesirably damaged.

Still yet further, in accordance with packaging techniques practiced or implemented by means of some of the cigarette manufacturing companies, auxiliary cardboard members are sometimes placed internally within the cigarette cartons so as to serve as spacer members, depending upon the relative size dimensions of the cigarette packages with respect to the size dimensions of the internal space defined within the cigarette cartons, or alternatively, so as to enhance the rigidity characteristics of the cigarette cartons in order to protect the internal cigarette packages from damage during handling and transporting of the same from commercial distribution centers to ultimate retail sales outlets. Providing the cigarette cartons with such enhanced rigidity characteristics can, however, present operational problems. For example, if the plow mechanism and pinch roller system, such as, for example, the system disclosed within the aforenoted Michalski patent, is utilized to effectively squeeze or pinch the cigarette carton between the pair of rollers in order to effectively cause the cigarette carton flap members to be formed into dome-shaped members by means of which the plow mechanism can be readily inserted beneath such dome-shaped carton flap members, the enhanced rigidity characteristics of the cigarette cartons effectively prevents the squeezing together of the side portions of the cigarette cartons and the consequent formation of the dome-shaped carton flap members. Therefore, since the carton flap members are not fully formed so as to exhibit their dome-shaped configurations, a sufficient insertion space is not effectively formed beneath the carton flap members so as to in fact permit the insertion of the plow mechanism within such space. Accordingly, the plow mechanism will again encounter or engage the carton flap members, and/or the side wall portions of the cigarette carton whereby, again, such structural components of the cigarette cartons may be undesirably damaged.

A need therefore exists in the art for a new and improved apparatus for applying tax stamps to individual cigarette packages contained within different cigarette cartons having different dimensions, wherein there will no longer be a need to necessarily scan each incoming cigarette carton for its particular size or height dimension such that the throughput processing speed of the apparatus is enchanced, wherein the various interactive or interoperative components of the apparatus which comprise, or are positioned at, for example, the carton flap opening station, the cigarette package tax stamp application station, and the carton flap closing station, will be able to be automatically adjusted by means of a single servo unit, wherein the carton flap opening station will comprise mechanisms for ensuring the individual opening of both the larger, outer carton flap member and the smaller, inner carton flap member, despite different size dimensions of the individual cigarette packages and cigarette cartons, so as to ensure proper preparation of the cigarette cartons for tax stamp application to the cigarette packages, and wherein the tax stamp application station will comprise mechanisms for ensuring that the tax stamps are always applied to central portions of each cigarette package, despite different size dimensions of the individual cigarette packages and cigarette cartons, whereby the previously experienced phenomenon of "chop-off" will effectively be prevented.

OBJECTS OF THE INVENTION

Accordingly, it is an object of the present invention to provide a new and improved machine, apparatus, or system for applying tax stamps to individual packages of cigarettes contained within cigarette cartons.

Another object of the present invention is to provide a new and improved machine, apparatus, or system, for applying tax stamps to individual packages of cigarettes contained within cigarette cartons, which effectively overcomes the various operational drawbacks or disadvantages characteristic of PRIOR ART stamp applicator machines, apparatus, or systems.

An additional object of the present invention is to provide a new and improved machine, apparatus, or system for applying tax stamps to individual packages of cigarettes contained within cigarette cartons wherein, despite any differences in the dimensions of the cigarette packages which are respectively disposed within different cigarette cartons, and in view of the particular packaging of the cigarette packages within the cigarette cartons, mechanisms are provided for ensuring the fact that the individual carton flap members of the cigarette cartons are opened to their full extent in preparation for the subsequent application of tax stamps to the individual cigarette packages.

A further object of the present invention is to provide a new and improved machine, apparatus, or system for applying tax stamps to individual packages of cigarettes contained within cigarette cartons wherein the various operative components disposed at the tax stamp application station ensure the fact that the tax stamps are applied to substantially centralized portions of each cigarette package so as to effectively eliminate or prevent the occurrence of the conventionally known phenomenon of "chop-off".

A last object of the present invention is to provide a new and improved machine, apparatus, or system, for applying tax stamps to individual packages of cigarettes contained within cigarette cartons, wherein the various operational stations, and operational procedures performed at such stations, are synchronized so as to significantly enhance the operational speed and throughput processing volume capabilities of the machine, apparatus, or system, and wherein access means are provided at each one of the various operational stations such that any jamming which may occur at any one of the various operational stations can be readily rectified so as to effectively minimize processing line downtime and thereby maintain enhanced throughput processing volume capabilities of the machine, apparatus, or system.

SUMMARY OF THE INVENTION

The foregoing and other objectives are achieved in accordance with the teachings and principles of the present invention through the provision of a new and improved apparatus, machine, or system, for applying tax stamps to individual packages of cigarettes contained within a carton of cigarettes, wherein the new and improved apparatus, machine, or system comprises a plurality of operational stations at which different operational procedures are adapted to be performed upon each cigarette carton and/or the individual cigarette packages contained within the cigarette cartons. More particularly, for example, a cigarette carton infeed station serially feeds the cigarette cartons toward a cigarette carton sensing station which senses the presence of a first one of a first set cigarette cartons and determines the height dimension of such first cigarette carton. The sensing station has a gate mechanism which is opened when the height dimension of the first cigarette carton of the first set of cigarette cartons is determined, and all cartons having the same height dimension can be continuously conveyed into and through the carton sensing station due to the fact that once the particular height dimension characteristic of all similarly sized cigarette cartons has been determined, no further height dimensional sizing for each individual cigarette carton needs to be implemented.

When a second set of cigarette cartons, having, for example, a height dimension which is different from that of the first set of cigarette cartons, is to be processed, then since the time that it normally requires an operator to introduce the differently sized, second set of cigarette cartons onto the infeed conveyor for conveyance toward the sensing station usually comprises a sufficiently definitive predetermined delay or discontinuous time period, such as, for example, approximately three seconds, the machine, apparatus, or system, effectively sensing such a delay in connection with the further processing of cigarette cartons, is automatically disposed in a reset mode whereby a new height dimension, characteristic of the subsequently conveyed second set of cigarette cartons, must be determined in order to actuate the gate mechanism for permitting processing of the second set of cigarette cartons to proceed. Once the cigarette cartons have had their height dimensions determined, such dimensional data is entered into the memory of a program logic controller (PLC). Downstream from the cigarette carton sensing station, there is located a cigarette carton flap unsealing station at which a cutting mechanism is utilized to sever the original adhesive bond defined between the top flap members of the cigarette cartons, flap opening stations at which the top flap members of the cigarette cartons are opened to their desired positions so as to permit access to the cigarette packages by means of a suitable stamp application mechanism located at a downstream tax stamp application station, and top flap reclosing and sealing stations at which the top flap members of the cigarette cartons are properly positioned so as to permit a suitable adhesive to be applied thereto, the top flap members then being closed and maintained in such position so as to permit the adhesive to cure and set. Pivotal access doors are also positioned at the various operational stations so as to readily permit access to a particular one of the cigarette cartons, and removal of the same if necessary, so as to effectively limit operational downtime.

In accordance with a first unique and novel feature characteristic of the present invention, top flap opening mechanisms are disposed at adjacent top flap opening stations for acting upon each one of the top flap members of each cigarette carton so as to ensure that each individual flap member is in fact positively opened to its fully OPENED state, in preparation for the performance of the tax stamp application procedure, in lieu of effectively relying upon the automatic opening of the top flap members of the cigarette carton once the adhesive bond between the top flap members is severed. Still further, in accordance with a second unique and novel feature characteristic of the present invention, in lieu of the stamping iron, disposed at the tax stamp application station, being indexably moved with respect to the particular cigarette carton disposed at the tax stamp application station, as well as with respect to the waxed tax stamp paper upon which the thermally activatable waxed tax stamps are disposed, the stamping iron is maintained at a fixed position with respect to cigarette carton disposed at the tax stamp application station while the waxed tax stamp paper support assembly is in fact mounted for indexable movement with respect to the stamping iron and the cigarette carton disposed at the tax stamp application station. In this manner, the application of the tax stamps to centralized portions or regions of each cigarette package is ensured, and the occurrence of the undesirable tax stamp "chop-off" phenomenon is effectively eliminated.

BRIEF DESCRIPTION OF THE DRAWINGS

Various other objects, features, and attendant advantages of the present invention will be more fully appreciated from the following detailed description when considered in connection with the accompanying drawings in which like reference characters designate like or corresponding parts throughout the several views, and wherein.

DETAILED DESCRIPTION OF THE PREFERRED EMBODIMENT

Figure 1:
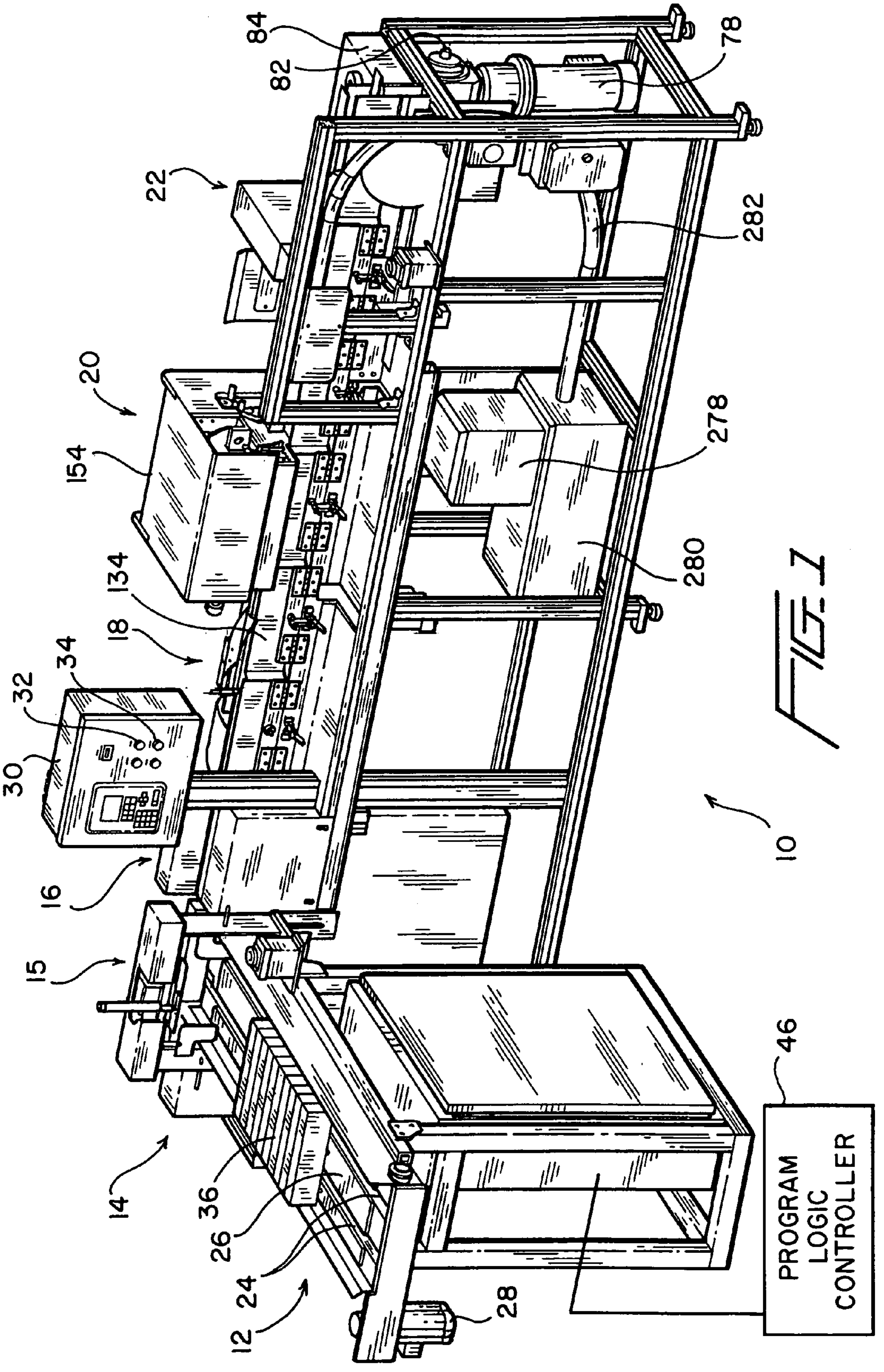
FIG. 1 is a perspective view of the new and improved synchronized central stamp applicator machine, apparatus, or system as constructed in accordance with the principles and teachings of the present invention and showing the operative components thereof which effectively define a processing line comprising the plurality of different processing or operational stations at which the various operations are to be performed in conjunction with each one of the cigarette cartons or in conjunction with each one of the cigarette packages contained within the cigarette cartons.

Referring now to the drawings, and more particularly to FIG. 1 thereof, a new and improved synchronized central stamp applicator machine, apparatus, or system, constructed in accordance with the principles and teachings of the present invention, is disclosed and is generally indicated by the reference character 10. As will be more fully appreciated from the detailed description which follows, the new and improved synchronized central stamp applicator apparatus, machine, or system 10 is seen to comprise a processing or operational line comprising a plurality of longitudinally spaced processing or operational stations at which various operations are respectively performed in connection with, or upon, each one of the cigarette cartons, or upon each one of the individual cigarette packages contained within the cigarette cartons. More particularly, for example, in accordance with a brief but non-limiting overview or perspective of the processing or operational line of the synchronized central stamp applicator machine or system 10 of the present invention, it is to be appreciated that the new and improved synchronized central stamp applicator machine, apparatus, or system 10 of the present invention is seen to comprise a cigarette carton infeed station 12 at which cigarette cartons are fed into the machine, apparatus, or system 10 for the stamp application processing thereof, a cigarette carton sensing and height determination station 14 for determining the height dimension of, for example, each set of cigarette cartons having the same height dimension, and a cigarette carton loading station 15 at which the cigarette cartons are adapted to be engaged by means of a longitudinally oriented transport mechanism which will serially transport the cigarette cartons from one processing station to a subsequent processing station located along the processing line.

Accordingly, once a particular cigarette carton is disposed at the cigarette carton loading station 15, it is adapted to be engaged by a suitable conveying member of the transport mechanism for continued conveyance through the synchronized central stamp applicator machine, apparatus, or system 10 of the present invention so as to be serially processed at the various processing stations of the synchronized central stamp applicator machine, apparatus, or system 10. In particular, then, each cigarette carton will be serially transported to a cigarette carton top flap member unsealing station 16 for severing the original adhesive bond defined between the top flap members of each cigarette carton whereby the top flap members of the cigarette carton will be disposed in a partially open state, a two-stage cigarette carton top flap opening station 18 at which the partially opened top flap members of each cigarette carton are individually opened to their full extent by means of individual top flap opening mechanisms in preparation for the application of a stamp to each one of the individual cigarette packages disposed within each cigarette carton, a cigarette package stamp applicator station 20 at which a thermally activatable waxed tax stamp is applied to each one of the cigarette packages contained within each one of the cigarette cartons, and a cigarette carton top flap closing and re-sealing station 22 at which each one of the cigarette cartons, having had tax stamps applied to each one of the individual cigarette packages contained therein, now has the smaller top flap member folded to its closed position, a suitable adhesive material is applied to an underside portion of the larger top flap member, the larger top flap member is subsequently folded over the smaller top flap member, and the adhesively bonded top flap members are maintained or held in their overlapped position so as to permit the adhesive material to cure and set.

Figure 2:
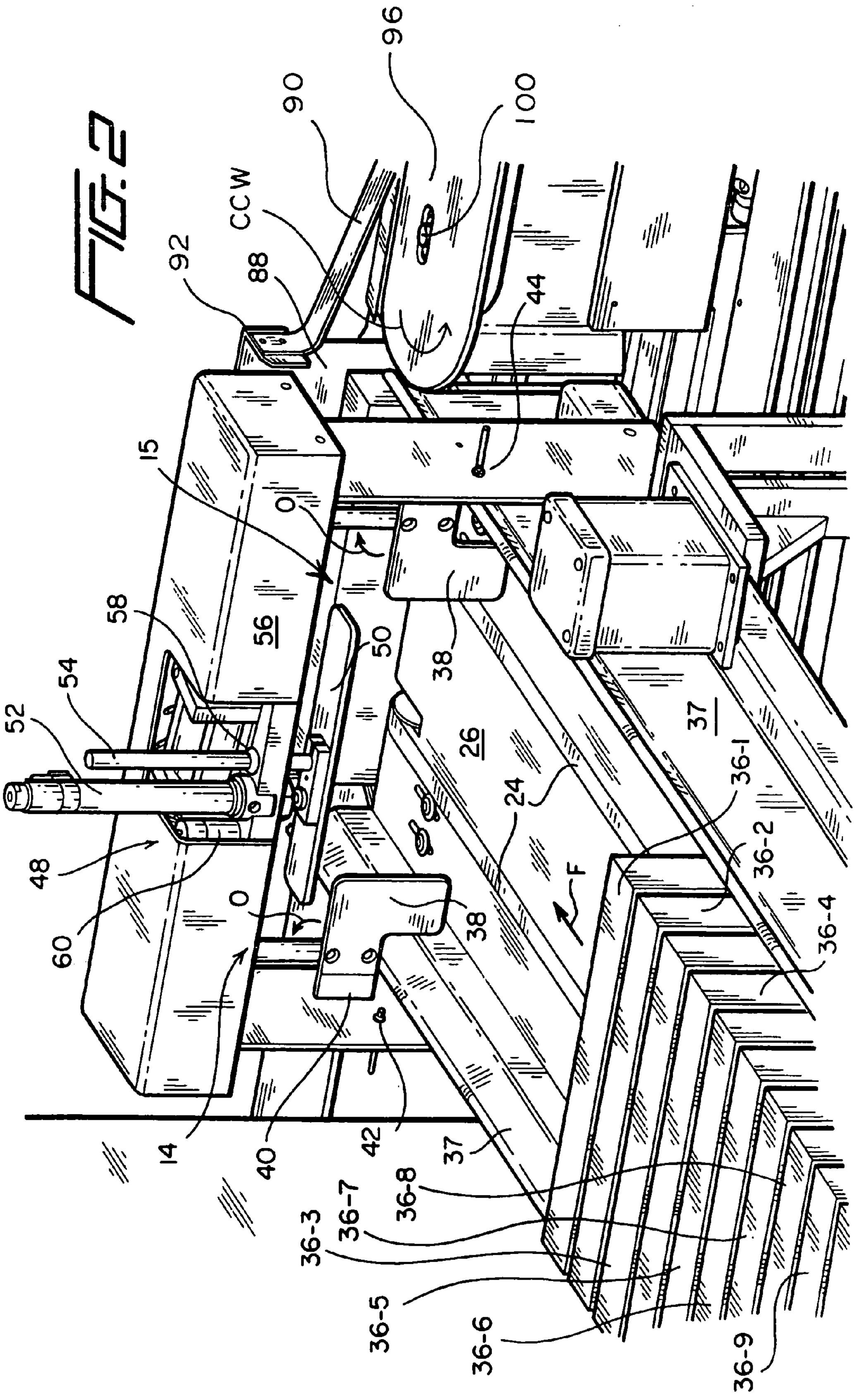
FIG. 2 is a perspective view showing the cigarette carton infeed station and the cigarette carton sensing and height determination station of the processing or operational line of the new and improved synchronized central stamp applicator machine, apparatus, or system of the present invention as disclosed within FIG. 1.

With reference now being made to FIGS. 1 and 2, the details of the cigarette carton infeed station 12 and the cigarette carton sensing and height determination station 14 will be described. More particularly, the cigarette carton infeed station 12 comprises an infeed conveyor comprising a pair of laterally spaced conveyor belts 24 which are operatively integrated within a cigarette carton infeed table 26 and are adapted to be continuously driven by means of a suitable motor drive 28 disposed adjacent to the infeed table 26. An operator console or control panel 30 is disposed to the right of the cigarette carton loading station 15 and the cigarette carton sensing and height determination station 14, and the console or control panel 30 may have, for example, START and STOP buttons 32,34 upon the front face thereof for controlling the motor drive 28. Accordingly, it can be further appreciated that when a plurality of cigarette cartons 36 are manually placed upon the cigarette carton infeed table 26 by means of operator personnel, and are effectively laterally confined between oppositely disposed side walls 37 of the infeed table 26, the conveyor belts 24 will effectively convey or transport the plurality of cigarette cartons 36 toward the cigarette carton sensing and height determination station 14.

As may best be appreciated from FIG. 2, the cigarette carton sensing and height determination station 14 is seen to comprise a pair of laterally spaced gate members 38 which are pivotally mounted upon suitable mounting brackets 40, only one of which is visible in FIG. 2, so as to be movable, by means not shown, between first relatively CLOSED positions at which the gate members 38,38 effectively block further advancement of the cigarette cartons 36 along the infeed table 26, and second relatively OPENED positions to which the gate members 38,38 have been pivoted in the directions of the arrows O so as to in fact permit the cigarette cartons 36 to be conveyed beyond the gate members 38, 38 and toward the cigarette carton loading station 15 so as to be readied for further processing within the synchronized central stamp applicator apparatus, machine, or system 10 of the present invention. Prior to such further processing of the cigarette cartons 36 within the machine, apparatus, or system 10 of the present invention, the gate members 38,38 are initially disposed at their first relatively CLOSED illustrated positions whereby, as a result of the conveyance of the cigarette cartons 36 along the infeed table 26 by means of the infeed conveyor belts 24 and in the conveyance direction F, the first or leading one of the cigarette cartons 36-1 will encounter the gate members 38,38 such that further conveyance of the cigarette cartons 36 is temporarily halted.

Accordingly, the first or leading one of the cigarette cartons 36-1 is now disposed at a height determination position, and a suitable sensor assembly, such as, for example, a photodetector assembly comprising a phototransmitter 42 and a coaxially aligned photoreceiver 44, is disposed immediately upstream of the gate members 38,38, as considered in the conveyance direction F of the cigarette cartons 36, so as to detect the presence of the first or leading one of the cigarette cartons 36-1 when in fact the first or leading one of the cigarette cartons 36-1 encounters the gate members 38,38 and is disposed at the height determination position. Upon detecting the presence of the first or leading one of the cigarette cartons 36-1, the photodetector assembly 42,44 will transmit a suitable signal to a program logic controller (PLC) 46, which is disposed beneath the infeed table 26 as best seen in FIG. 1, and the program logic controller (PLC) 46, in turn, will transmit a suitable control signal to a cigarette carton height determination mechanism or assembly 48. More particularly, the cigarette carton height determination mechanism or assembly 48 is seen to comprise a cigarette carton height determination plate 50 which is mounted upon the lower end portion of, for example, a pneumatically-driven piston-cylinder assembly 52 such that the cigarette carton height determination plate 50 can be moved vertically upwardly and downwardly so as to be adjustably moved into engagement with the upper or top side portion of, for example, the first or leading one of the cigarette cartons 36-1 disposed at the height determination position. The cigarette carton height determination plate 50 also has a vertically upstanding guide rod 54 fixedly mounted thereon such that the vertically adjusted movements of the cigarette carton height determination plate 50, as controlled by means of the piston-cylinder assembly 52, can be properly guided and stabilized. The cylinder member of the pneumatically-driven piston-cylinder assembly 52 is fixedly mounted within a height determination station housing 56, and a bearing member 58 is likewise fixedly mounted within the housing 56 so as to permit the height determination plate guide rod 54 to undergo vertically oriented slidable or linear movements with respect thereto.

Still further, a suitable distance sensor mechanism 60, such as, for example, an ultrasonic sensor, is likewise fixedly mounted within the housing 56, and accordingly, when the pneumatically-driven piston-cylinder assembly 52 lowers the cigarette carton height determination plate 50 into engagement with the upper or top side portion of the first or leading one of the cigarette cartons 36-1 in response to the control signal issued by means of the program logic controller (PLC) 46, the ultrasonic sensor 60 can determine the distance of the height determination plate 50 from the sensor 60. Since the distance defined between the sensor 60 and the upper surface portion of the cigarette carton infeed table 26, upon which the cigarette cartons 36 are being conveyed, is known as a result of having been predetermined or preset, the ultrasonic sensor mechanism 60 can readily determine the height dimension of the particular cigarette carton 36-1 disposed at the height determination position.

Accordingly, this cigarette carton height information or data is transmitted from the ultrasonic sensor 60 to the program logic controller (PLC) 46 for storage therein as well as for subsequent usage and control processing. For example, after the height dimension of the first or leading one of the cigarette cartons 36-1 has been determined, the program logic controller (PLC) 46 will transmit another control signal to the actuating mechanisms, not shown, controlling the pivotal movements of the gate members 38,38 so as to cause the gate members 38,38 to be moved to their relatively OPENED positions. Therefore, the conveyor belts 24,24 are now able to further convey the cigarette cartons 36 to a position downstream from the height determination station 14 such that the first or leading one of the cigarette cartons 36-1 is now disposed at the cigarette carton loading station 15. In addition, the program logic controller (PLC) 46 also uses such cigarette carton height dimension data stored within its memory to properly pre-position or pre-dispose a support mechanism, upon which each one of the cigarette cartons 36 is disposed for transportation from the cigarette carton loading station 15 to each one of the serially spaced processing stations 16-22 by means of a suitable transport mechanism, at a predeterminedly proper elevational level.

Figure 3:
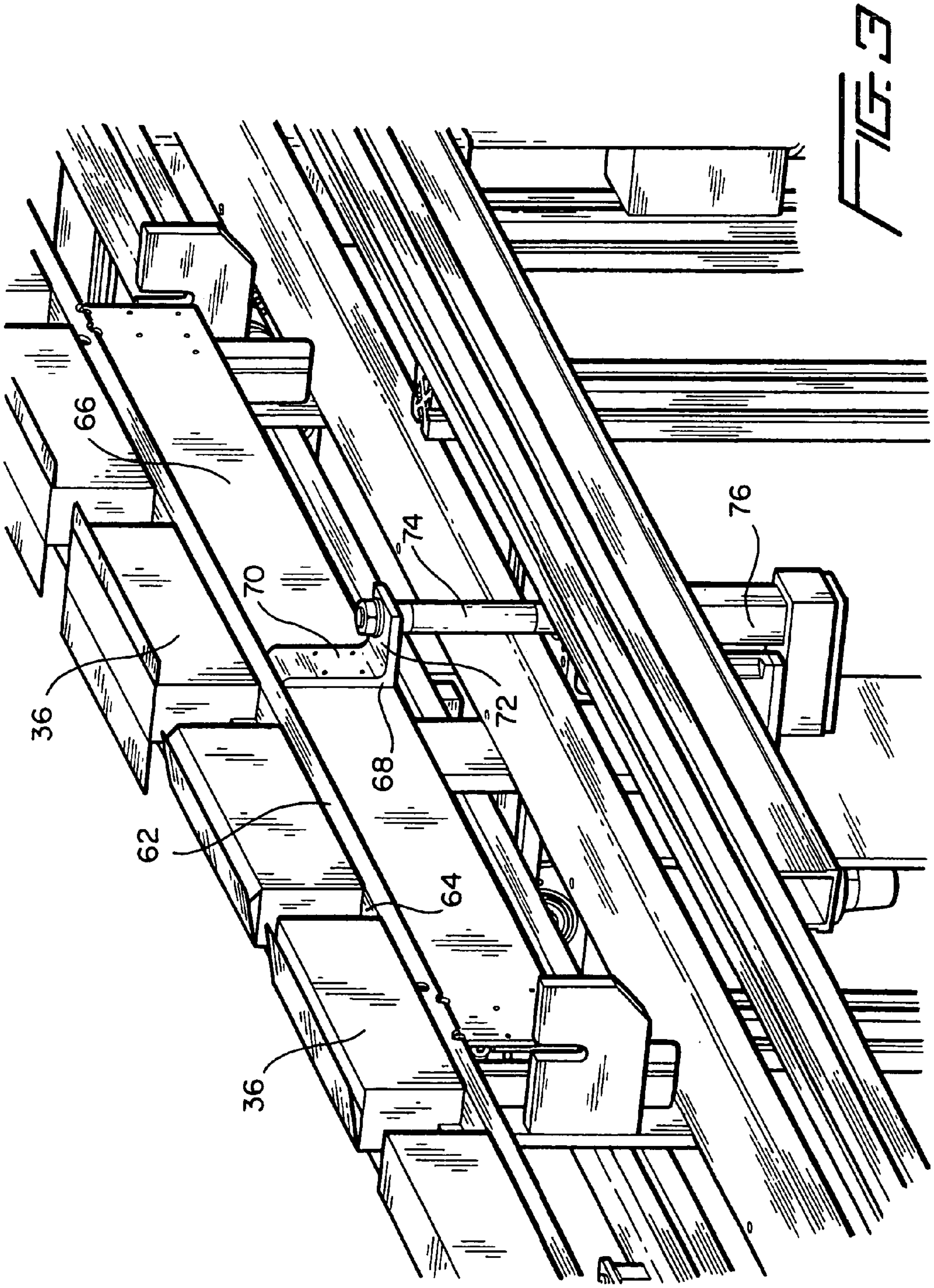
FIG. 3 is a perspective view of the single servo mechanism and linear actuator assembly utilized within the new and improved synchronized central stamp applicator machine, apparatus, or system of the present invention in order to adjustably elevate, either upwardly or downwardly, the disposition of the rail member upon which the cigarette cartons are conveyed from station to station of the machine or system processing line as disclosed within FIG. 1, the various operative components of the various stations having been omitted for clarity purposes.

In this manner, when each one of the cigarette cartons 36 is consecutively moved to each one of the serially arranged operational or processing stations 16-22, the cigarette cartons 36 will be disposed at proper elevational levels so as to be properly engaged by and acted upon by means of the various operational components disposed at the various processing or operational stations 16-22. More particularly, as can best be appreciated from FIG. 3, the support mechanism, upon which each one of the cigarette cartons 36 is disposed for transportation to each one of the serially spaced processing stations 16-22 by means of the transport mechanism, comprises a rail member 62 which comprises a horizontally disposed leg or member defining a horizontally disposed support surface 64 upon which all of the plurality of cigarette cartons 36 are movably supported while being transported between the various processing stations 16-22, and a vertically disposed leg or member, not shown for clarity purposes, upon which a vertically oriented mounting plate 66 is fixedly secured. A substantially L-shaped mounting bracket 68 is adapted to be fixedly mounted upon the vertically oriented mounting plate 66 by means of its vertically oriented leg member 70, while the horizontally oriented leg member 72 projects outwardly away from the mounting plate 66 a predetermined distance so as to be capable of fixedly mounting the upper end portion of a linear actuator component 74 of a servo mechanism 76 therein.

The servo mechanism 76 is adapted to receive cigarette carton height dimension data information signals from the program logic controller (PLC) 46, and accordingly, it can be readily appreciated that when particular cigarette carton height dimension data information signals are transmitted from the program logic controller (PLC) 46 to the servo mechanism 76, the servo mechanism 76 will actuate the linear actuator 74 so as to precisely extend or retract the linear actuator 74 which in turn correspondingly moves the support rail member 62 upwardly or downwardly. In this manner, the elevational level or disposition of the upper, horizontally disposed support surface 64 of the support rail member 62 is disposed at precisely the correct elevational level so as to, in turn, dispose the cigarette cartons 36 at precisely the correct or proper elevational level with respect to the various operational components disposed at the various operational or processing stations 16-22. In this manner, the various operational components of the various operational or processing stations 16-22 can in fact properly perform their particular operations upon the cigarette cartons 36 or the cigarette packages located within each cigarette carton 36. In particular, since the various operational components, which are all disposed at the various operational or processing stations 16-22 so as to be positioned at predetermined elevational levels with respect to each other, can properly engage the cigarette cartons 36, or the cigarette packages contained within each one of the cigarette cartons 36, as a result of the elevational adjustment of the rail member 62 by means of the servo mechanism 76 and linear actuator 74, then such operational components can perform their various operational procedures upon the cigarette cartons 36, or upon the cigarette packages contained within each one of the cigarette cartons 36, without, for example, causing any structural damage to the cigarette cartons 36, or to any of the cigarette packages contained within the cigarette cartons 36, or without causing jamming of the cigarette cartons 36 within or along the processing line. In addition, the use of a single servo-actuator system vastly simplifies the structural constitution of the overall synchronized central tax stamp applicator machine or system 10.

It is to be additionally noted that, in conjunction with a plurality or group of cigarette cartons 36 wherein all of the cigarette cartons 36 have the same height dimension, once the height dimension of the leading one of the cigarette cartons 36-1, which is being conveyed along the infeed table 26, has been determined by means of the height determination sensor 60, then the height dimensions of the remaining cigarette cartons 36 need not be determined, and in this manner, the cigarette carton processing is rendered continuous whereby needless height dimension determination processing of every cigarette carton is effectively eliminated such that the overall processing time of the cigarette cartons is minimized. This continuous processing is ensured by means of a suitable cigarette carton sensor which is not shown but which may be similar to the photodetector assembly 42,44. This cigarette carton sensor is fixedly mounted upon the upper support surface 64 of the rail member 62 and is located at the cigarette carton loading station 15. Therefore, as the cigarette cartons 36 are continuously fed into the cigarette carton loading station 15, the cigarette carton sensor, not shown, senses the consecutive presence of the serially conveyed cigarette cartons 36 and transmits a suitable signal to the program logic controller (PLC) 46 which, in turn, continuously transmits control signals to the actuating mechanisms, not shown, which control the pivotal movements of the gate members 38,38 so as to maintain the gate members 38,38 in their relatively OPENED positions.

If, however, the cigarette carton sensor does not in fact detect the presence of a cigarette carton at the cigarette carton loading station 15 within a predetermined period of time, then a suitable signal is sent to the program logic controller (PLC) 46 whereby the program logic controller (PLC) 46 in turn transmits a suitable signal to the actuating mechanisms, not shown, which control the pivotal movements of the gate members 38,38 so as to now dispose the gate members 38,38 in their relatively CLOSED positions. Accordingly, a new height determination processing cycle must now be initiated in connection with, for example, a new or different group or plurality of cigarette cartons 36 which have height dimensions which are different from those of the previously processed group of cigarette cartons. Such a discontinuity in connection with the conveyance of the cigarette cartons 36 along the infeed table 26 normally occurs only when a different set or group of cigarette cartons, having different height dimensions from those of a previously conveyed group or set of cigarette cartons, are to be conveyed along the infeed table 26. More particularly, the time that is normally required for operator personnel to effectively load the new group or set of cigarette cartons 36, having height dimensions which are different from those of the previously processed group or set of cigarette cartons, onto the infeed table 26 will be sufficient for the cigarette carton sensor, located at the cigarette carton loading station 15, to sense the absence of a cigarette carton at the cigarette carton loading station 15 for the predetermined period of time and to effectively instruct the program logic controller (PLC) 46 to cause the gate members 38,38 to be moved to their CLOSED positions.

Figure 4:
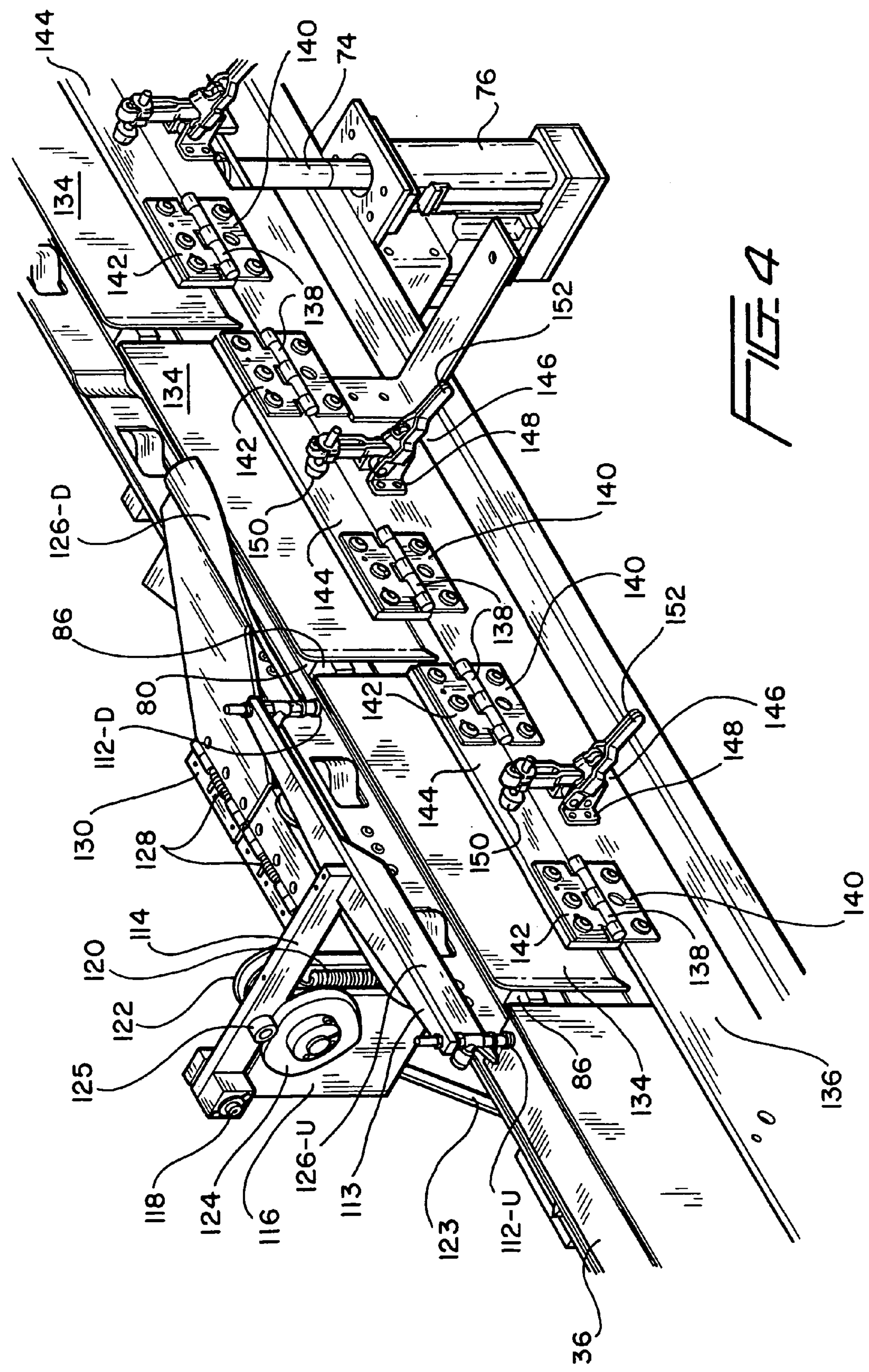
FIG. 4 is a perspective view of the cigarette carton top flap unsealing station, of the processing or operational line of the new and improved synchronized central stamp applicator machine, apparatus, or system of the present invention as disclosed within FIG. 1, at which the top flap members of each cigarette carton are initially opened or separated from each other by means of a suitable cutting mechanism which severs the initial or original adhesive bond defined between the overlapped top flap members of the cigarette carton, and wherein subsequently, the individual top flap members of each cigarette carton are positively opened to their full OPENED states by means of separate carton flap opening mechanisms of a top flap opener assembly in preparation for the application of a tax stamp to each one of the individual cigarette packages disposed within each cigarette carton.

Continuing further, and with reference being made to FIGS. 1 and 4, in addition to the cigarette carton sensor, not shown, being operatively connected to the program logic controller (PLC) 46, the cigarette carton sensor, not shown, is also operatively connected to a suitable drive motor 78. The drive motor 78 is, in turn, operatively connected to a longitudinally movable transfer mechanism 80 as well as to a rotary accessory shaft 82 through means of a suitable transmission or the like 84. A part of the transfer mechanism 80 can be seen in FIG. 4, the extreme right end of the accessory shaft 82 can likewise best be seen in FIG. 1, and it is to be appreciated that both the transfer mechanism 80 and the accessory shaft 82 extend throughout the entire length of the apparatus, machine, or system 10 as defined by means of the various operational or processing stations 15-22. The longitudinally movable transfer mechanism 80 may comprise any suitable longitudinally extending conveyor, such as, for example, a chain drive mechanism, and a plurality of carton pusher or conveying implements 86 are disposed at predetermined equally spaced locations upon the chain drive transfer mechanism 80 as can also best be seen from FIG. 4. The carton pusher or conveying implements 86 project forwardly from the chain drive transfer mechanism 80, and the spacing between consecutive carton pusher or conveying implements 86 defines a predetermined pitch such that the carton pusher or conveying implements 86 can respectively engage the cigarette cartons 36 in a serial manner so as to longitudinally transfer or transport the same from the cigarette carton loading station 15 to the downstream operational or processing stations 16-22 which are likewise spaced the same predetermined distances apart.

In particular, after the conveyor belts 24,24 have transferred the cigarette cartons 36 toward the cigarette carton height determination station 14, and after the height dimension of the leading one of the cigarette cartons 36-1 has been determined whereby the gate mechanisms 38,38 have been moved to their OPENED positions, the leading one of the cigarette cartons 36-1 is conveyed toward the downstream end portion of the infeed table 26. Upon reaching the downstream end portion of the infeed table 26, the leading one of the cigarette cartons 36-1 will effectively drop off the downstream end portion of the infeed table 26 and onto the horizontally disposed support surface 64 of the rail member 62 so as to also engage a backstop member 88 which facilitates the proper disposition of each one of the cigarette cartons 36 onto the horizontally disposed support surface 64 of the rail member 62. Accordingly, since the leading one of the cigarette cartons 36-1 is now disposed upon the horizontally disposed support surface 64 of the rail member 62, the cigarette carton sensor, not shown, will detect the presence of the leading one of the cigarette cartons 36-1 at the cigarette carton loading station 15 so as to activate the drive motor 78 whereby the transfer mechanism 80 is driven such that the first or leading one of the cigarette cartons 36-1 is now transferred from the cigarette carton loading station 15 to the cigarette carton top flap member unsealing station 16. Successive ones of the cigarette cartons 36 are conveyed and transferred in a similar manner, however, in the absence of cigarette cartons, and the detection of such a cigarette carton absence state by means of the cigarette carton sensor at the cigarette carton loading station 15, the operations of the drive motor 78, the longitudinal movement of the transfer mechanism 80, and the rotary movement of the accessory shaft 82, will all be terminated.

With reference continuing to be made to FIGS. 1 and 4, as well as to FIGS. 2 and 5, the details of the cigarette carton top flap member unsealing station 16, and the two-stage cigarette carton top flap opening station 18, will now be described. Each successive cigarette carton 36, having been previously disposed at the cigarette carton loading station 15, is next moved, transferred, or conveyed from the cigarette carton loading station 15 to the cigarette carton top flap member unsealing station 16 so as to have the adhesive seal or bond, originally maintaining the top flap members of each cigarette carton 36 in their CLOSED positions with respect to each other, effectively broken in preparation for the top flap members of each cigarette carton 36 to be moved to their fully OPENED positions so as to in turn enable the cigarette packages contained within each cigarette carton 36 to have tax stamps applied thereto. More particularly, as each one of the cigarette cartons 36 enters the cigarette carton top flap member unsealing station 16, a leaf spring member 90, mounted in a cantilevered manner upon a suitable mounting bracket 92, is adapted to loosely engage the upper or outer surface of the larger top flap member 94-L of the cigarette carton 36 so as to simply help maintain the cigarette carton 36 in a stabilized state upon the upper surface portion 64 of the rail member 62. As has been noted, the larger and smaller top flap members 94-L,94-S are disposed in their relatively CLOSED positions, however, each cigarette carton 36 is conveyed to a predetermined finalized position within the cigarette carton top flap member unsealing station 16 at which the cigarette carton 36 is stopped such that the top flap members 94-L,94-S can now be effectively unsealed and disposed at their partially OPENED positions with respect to each other.

In order to therefore unseal and disposed the top flap members 94-L,94-S of each cigarette carton 36 at their partially OPENED positions, a support plate 96 is fixedly disposed at the cigarette carton top flap member unsealing station 16, and a drive chain, not shown, is drivingly disposed beneath the support plate 96 along a substantially oval or elliptical locus. A cutter blade implement, not shown, is fixedly mounted upon the drive chain, and accordingly, when the drive chain is driven in a counterclockwise direction CCW, the cutter blade implement is utilized to sever the adhesive seal or bond defined between the cigarette carton top flap members 94-L, 94-S. The drive chain is drivingly mounted upon a pair of laterally spaced drive chain sprocket members, the rotary shaft of one of the sprocket members being illustrated at 100, and in order to drivingly rotate the sprocket members, a suitable drive pulley system, not shown, operatively interconnects the drive chain to the accessory drive shaft 82. In this manner, as the accessory drive shaft 82 is rotated, the drive chain, and therefore the cutter blade implement, is rotated along the elliptical locus defined beneath the support plate 96 as a result of the operative connections between the drive chain, the pulley system, and the accessory drive shaft 82. Continuing further, in order to facilitate the insertion of the cutter blade implement, not shown, into the interstice or space defined between the larger and smaller top flap members 94-L,94-S of each cigarette carton 36, when a particular one of the cigarette cartons 36 is disposed at the cigarette carton top flap member unsealing station 16, several auxiliary implements are also disposed at the cigarette carton top flap member unsealing station 16 as well as at the two-stage cigarette carton top flap opening station 18 which is disposed immediately downstream from the cigarette carton top flap member unsealing station 16.

More particularly, a pair of longitudinally spaced suction cup or vacuum cup assemblies 112-U,112-D are fixedly mounted upon opposite ends of a longitudinally extending mounting bar 113, and the mounting bar 113 is, in turn, fixedly mounted upon a transversely oriented support arm 114 which is pivotally mounted upon a support block or support plate 116 by means of a pivot pin 118. A spring member 120 operatively interconnects the support arm 114 to a framework portion, not shown, of the apparatus within the vicinity of the cigarette carton top flap member unsealing and cigarette carton top flap member opening stations 16,18 so as to normally dispose or bias the support arm 114, and therefore the suction cup or vacuum cup assemblies 112-U,112-D, toward a downward or lowered position such that the suction cup or vacuum cup assemblies 112-U,112-D are disposed at elevational levels which are immediately above both of the top flap members 94-L,94-S of adjacent cigarette cartons 36 disposed at the cigarette carton top flap member unsealing and cigarette carton top flap member opening stations 16,18. A drive pulley 122 is rotatably mounted upon the support block 116, and a pulley belt 123 has one looped end thereof disposed around the drive pulley 122 while the other looped end, not shown, of the pulley belt 123 is operatively disposed around the accessory drive shaft 82. A suitable cam member 124 is mounted upon the shaft of the drive pulley 122 so as to be rotatably driven thereby, and the cam member 124 is adapted to be operatively engageable with a cam follower 125 which is mounted upon the support arm 114. In this manner, as the drive pulley 122 undergoes rotation, the corresponding rotation of the cam member 124 will cause the radial cam portion thereof to operatively engage the cam follower 125 and thereby cause the upward elevation of the support arm 114 against the biasing force of the spring member 120. The upward and downward movement of the support arm 114 is appropriately timed with the actuation of a suitable vacuum acting through the suction cup assemblies 112-U,112-D such that the top flap members 94-L,94-S of the cigarette carton 36 will be lifted to sufficient extents so as to not only permit the insertion of the cutter blade implement into the interstice or space defined between the cigarette carton top flap members 94-L,94-S so as to sever the adhesive bond defined between the cigarette carton top flap members 94-L,94-S, but in addition, to facilitate the insertion of individual cigarette carton top flap member opening members beneath each one of the cigarette carton top flap members 94-L,94-S so as to ensure the opening of each one of the cigarette carton top flap members 94-L,94-S to their fully OPENED positions as will be more fully disclosed hereinafter. It is to be noted that the activation of the vacuum or suction operatively associated with the suction cup assemblies 112-U, 112-D may be achieved by any one of several different means, such as, for example, suitable cam mechanisms disposed upon the accessory drive shaft 82 for directly activating suitable valving mechanisms operatively associated with the suction cup assemblies 112-U,112-D, or alternatively, for causing suitable signals to be transmitted to the program logic controller (PLC) 46 which will, in turn, transmit suitable control signals for controlling the activation of the valving mechanisms.

As has been noted hereinbefore, as a result of the severance of the adhesive bond, as defined between the cigarette carton top flap members 94-L,94-S, by means of the cutter blade implement, not shown, the unsealed cigarette carton top flap members 94-L,94-S of the cigarette carton 36 will be disposed in a partially OPENED state, due to the fact that they are no longer bonded together, in preparation for their subsequent movement to their fully OPENED state. However, as has also been noted hereinbefore, the unsealed or partially OPENED state of the cigarette carton top flap members 94-L, 94-S of the cigarette carton 36 does not necessarily inherently ensure the fact that suitable implements can be properly inserted beneath the unsealed and partially OPENED cigarette carton top flap members 94-L,94-S so as to subsequently cause the cigarette carton top flap members 94-L,94-S to be moved to their fully OPENED state or positions whereby the cigarette packages, contained within each cigarette carton 36, will be properly exposed so as to permit tax stamps to be subsequently applied thereto.

Figure 5:
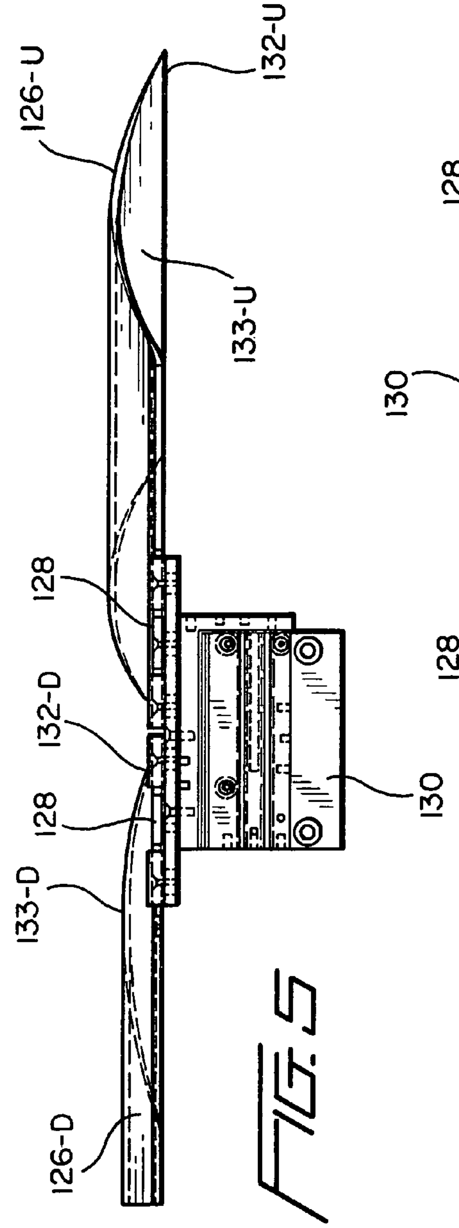
FIG. 5 is a rear elevation view of the dual carton flap opening mechanisms of the top flap opener assembly for individually interacting with the large and small top flap members of each cigarette carton in order to positively move each top flap member from its CLOSED position to its fully OPENED position.
Figure 5A:
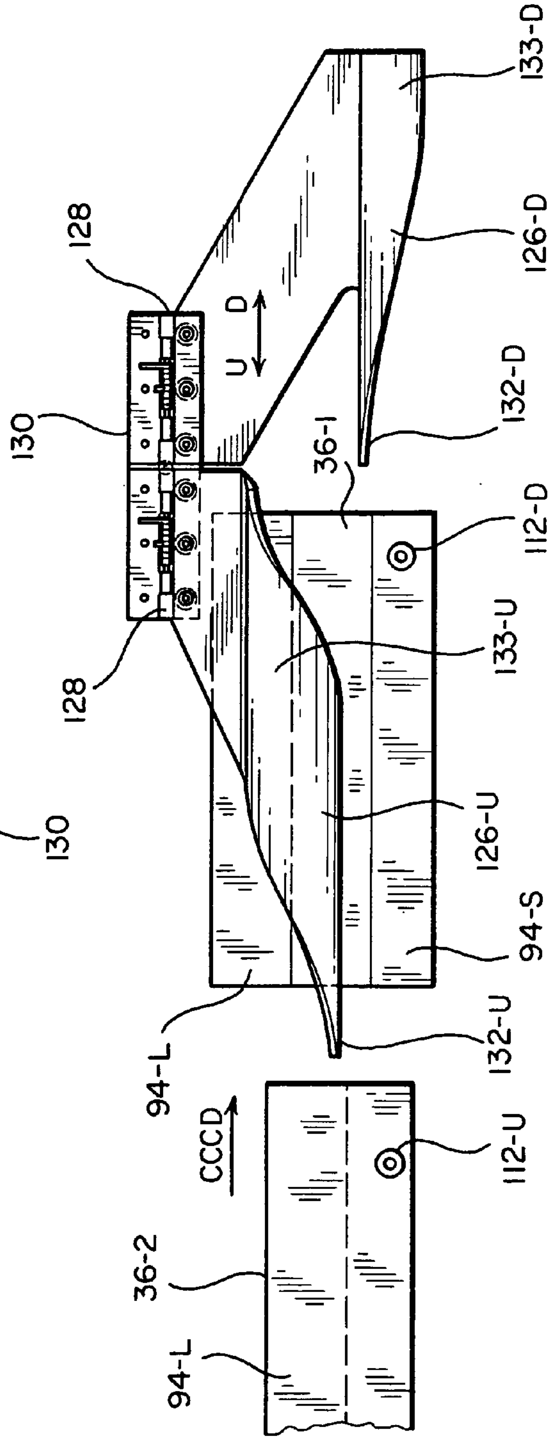
FIG. 5*a* is a schematic view of the carton flap opening mechanisms of the top flap opener assembly, as disclosed within FIG. 4, showing the operative interaction between the top flap opening mechanisms and two serially conveyed cigarette cartons whereby the larger, outer, and smaller, inner top flap members of each cigarette carton are able to be positively opened to their full OPENED states in preparation for the application of a tax stamp to each one of the individual cigarette packages disposed within each cigarette carton.

Accordingly, as may best be appreciated as a result of reference being made to FIGS. 4,5, and 5*a*, and in accordance with a first unique and novel structural feature characteristic of the present invention, there is provided a pair of longitudinally spaced cigarette carton top flap member opening mechanisms or plow members 126-U,126-D. The plow members 126-U,126-D are hingedly mounted, by means of suitable hinge mechanisms 128, upon a suitable mounting bracket assembly 130, and the mounting bracket assembly 130 is adapted to be slidably mounted, in a reciprocating manner as denoted by means of the double-arrowhead U-D, upon a suitable rail or track member, not shown, which is disposed within the vicinity of the two-stage cigarette carton top flap member opening station 18. The motive power for the mounting bracket 130 may be, for example, pneumatic, and the movement of the same is under the control of the program logic controller (PLC) 46. In this manner, the mounting bracket assembly 130 effectively defines a shuttle or slide mechanism.

As can best be appreciated from FIG. 5*a*, each one of the cigarette carton top flap member opening mechanisms or plow members 126-U,126-D is seen to comprise an upstream pointed or tapered end portion 132-U,132-D, and an arcuate or flared portion 133-U,133-D extending in the downstream direction as considered in accordance with the processing directional movement of the cigarette cartons 36 as denoted by means of the arrow CCCD. In conjunction with the cyclic longitudinal indexable conveyance or transfer operation serially performed or conducted with respect to the plurality of cigarette cartons 36 at the various operational or processing stations, and as can be additionally appreciated as a result of reference also being made to FIG. 4, as the first cigarette carton 36-1 is moved to and disposed at the cigarette carton top flap member unsealing station 16, the support arm 114 will be lowered and the vacuum or suction cup assemblies 112-U,112-D will be activated such that the upstream vacuum or suction cup assembly 112-U will engage the larger or outer flap member 94-L of the first cigarette carton 36-1 so as to effectively elevate or raise the same and thereby cause a space or interstice to be defined between the larger or outer and smaller or inner cigarette carton flap members 94-L,94-S. In this manner, when the cutter mechanism, not shown, is suitably actuated, the cutter mechanism can sever the adhesive bond originally defined between the larger or outer and smaller or inner cigarette carton flap members 94-L,94-S. At the same time, and while the vacuum or suction cup assemblies 112-U,112-D are still activated such that the vacuum or suction cup assembly 112-U is still engaged with the unsealed, partially opened larger or outer carton flap member 94-L of the first cigarette carton 36-1 so as to ensure the maintenance of the same in an elevated or raised position with respect to the cigarette carton 36-1 per se, the shuttle or slidle mechanism 130 is moved in the upstream direction U from its HOME position, as illustrated in FIG. 5*a*, to its ENGAGED position such that the upstream pointed end tip portion 132-U of the upstream cigarette car-ton top flap member opening mechanism or plow member 126-U is able to be effectively inserted beneath the raised or elevated larger or outer carton flap member 94-L of the first cigarette carton 36-1.

Subsequently, the vacuum or suction cup assemblies 112-U,112-D are deactivated, the support arm 114 is raised by the cam mechanism 124, and the first cigarette carton 36-1 is indexably moved downstream, by means of the transfer mechanism 80, from the cigarette carton flap unsealing station 16 toward the two-stage cigarette carton top flap member opening station 18 such that the first cigarette carton 36-1 is disposed at the first position of the two-stage cigarette carton top flap member opening station 18. In this manner, the relative movement occurring between the first cigarette carton 36-1 and the outwardly flared portion 133-U of the upstream cigarette carton top flap member opening mechanism or plow member 126-U results in the larger or outer carton flap member 94-L being moved from its partially opened state or position to its fully OPENED state or position as illustrated in FIG. 5*a*. It is additionally noted that once the upstream pointed end tip portion 132-U of the upstream cigarette carton top flap member opening mechanism or plow member 126-U has been inserted beneath the raised or elevated larger or outer carton flap member 94-L of the first cigarette carton 36-1, and while the first cigarette carton 36-1 is being indexed from the cigarette carton flap unsealing station 16 toward the two-stage cigarette carton top flap member opening station 18, the shuttle or slide mechansim 130 is moved, in the downstream direction D, from its ENGAGED position back to its HOME position in preparation for the next processing phase or stage of the operation as will be disclosed shortly. It is noted that during this retrograde movement of the shuttle or slide mechanism 130 back to its HOME position, the same is moved at a rate of speed which is less than the speed at which the cigarette cartons 36 are indexed by means of the transfer mechanism 80 so as to ensure that the upstream cigarette carton top flap member opening mechanism or plow member 126-U remains operatively engaged with the larger or outer carton flap member 94-L of the first cigarette carton 36-1 whereby the outwardly flared portion 133-U of the up-stream cigarette carton top flap member opening mechanism or plow member 126-U can in fact move the outer carton flap member 94-L from its partially opened state or position to its fully OPENED state or position as illustrated in FIG. 5*a*.

It is of course to be further appreciated that as the first cigarette carton 36-1 is indexed from the cigarette carton flap unsealing station 16 to the first stage position of the two-stage cigarette carton top flap member opening station 18 as illustrated within FIG. 5*a*, the second cigarette carton 36-2 is likewise indexed from the cigarette carton loading station 15 to the cigarette carton flap unsealing station 16 as is also illustrated in FIG. 5*a*. As is additionally illustrated in FIG. 5*a*, it is noted that at this point in time, that is, when the first and second cigarette cartons 36-1,36-2 have been indexed to the illustrated positions, and when the cigarette carton top flap member opening mechanisms or plow members 126-U, 126-D are disposed at their HOME positions, the cigarette carton top flap member opening mechanisms or plow members 126-U,126-D are respectively disposed downstream of the second and first cigarette cartons 36-2,36-1 as considered in the direction of the cigarette carton conveying direction CCCD. Accordingly, the next cigarette carton processing phase or stage is ready to be commenced whereby, for example, the adhesive bond defined between the cigarette carton top flap members 94-L,94-S of the second cigarette carton 36-2 is to be severed, the outer or larger carton flap member 94-L of the second cigarette carton 36-2 is to be moved to its fully OPENED position, and the inner or smaller carton flap member 94-S of the first cigarette carton 36-1, wherein the outer or larger carton flap member 94-L of the first cigarette carton 36-1 has already been moved to its fully OPENED position, is likewise to be moved to its fully OPENED position.

Accordingly, the cam mechanism 124 and the biasing spring 120 operatively cooperate together so as to permit the support arm 114 to be moved downwardly to its lowered position, and the vacuum or suction cup assemblies 112-U, 112-D are activated. In this manner, the upstream vacuum or suction cup assembly 112-U operatively engages the outer or larger carton flap member 94-L of the second cigarette carton 36-2 so as to effectively elevate or raise the same, while the downstream vacuum or suction cup assembly 112-D operatively engages the inner or smaller carton flap member 94-S of the first cigarette carton 36-1 so as to similarly elevate or raise the same. As a result of the elevation or raising of the outer or larger carton flap member 94-L of the second cigarette carton 36-2, the cutter blade mechanism, not shown, is permitted to be inserted into the space or interstice defined between the outer, larger and inner, smaller carton flap members 94-L, 94-S of the second cigarette carton 36-2 and thereby sever the adhesive bond defined therebetween. In addition, and while the vacuum or suction cup assemblies 112-U,112-D are maintained active, the shuttle or slide mechanism 130 is moved in the upstream direction U, from the HOME position to the ENGAGED position, whereby the pointed tip portions 132-U,132-D of the cigarette carton top flap member opening mechanisms or plow members 126-U,126-D will be respectively inserted beneath the outer, larger carton flap member 94-L of the second cigarette carton 36-2 and the smaller, inner carton flap member 94-S of the first cigarette carton 36-1.

Accordingly, after the vacuum or suction cup assemblies 112-U,112-D have been deactivated, and when the cigarette cartons 36-1,36-2 are indexed downstream in the cigarette carton conveying direction CCCD by means of the transfer mechanism 80, the upstream carton top flap member opening mechanism or plow member 126-U will cause the outer, larger carton flap member 94-L of the second cigarette carton 36-2 to be moved from its partially opened state or position to its fully OPENED state or position, and the downstream carton top flap member opening mechanism or plow member 126-D will cause the inner, smaller carton flap member 94-S of the first cigarette carton 36-1 to be moved from its partially opened state or position to its fully OPENED state or position. As has been previously noted, while the cigarette cartons 36 are being indexably moved by means of the transfer mechanism 80, the shuttle or slide mechanism 130 is retracted back from its ENGAGED position to the HOME position in preparation for a new or subsequent processing cycle. It is also of course now appreciated that as a result of the first cigarette carton 36-1 having had both its outer, larger and inner, smaller flap members 94-L,94-S moved to their fully OPENED states or positions, the cigarette packages contained within the first cigarette carton 36-1 are now fully exposed to as to be ready to have tax stamps applied thereto when the cigarette cartons are indexed further whereby the first cigarette carton 36-1 is indexably moved to the tax stamp application station 20.

It is noted at this junction, and in conjunction with the foregoing, that in order to permit operator personnel to readily have access to any one of the cigarette cartons 36 which may be disposed at any one of the operational or processing stations 15-22 disposed along the operational or processing line when, for example, one of the cigarette cartons 36 has, for example, not been properly processed, or similarly, when one of the cigarette cartons 36 has in effect become jammed at a particular location along the operational or processing line, unique and novel access means have been provided at substantially each one of the operational or processing stations 15-22 of the operational or processing line. More particularly, as can best be seen in FIGS. 1,4, and 17, a plurality of access door members 134 are pivotally mounted upon a single elongated fixed wall member 136 which extends longitudinally along substantially the entire operational or processing line of the machine or system 10. Suitable hinge mechanisms 138 comprise first and second hinge plate members 140,142 wherein the lower hinge plate member 140 is fixedly mounted upon the fixed wall member 136 while the upper hinge plate member 142 is fixedly mounted upon the forward surface of a mounting plate 144 while the lower edge portion of each door member 134 is fixedly mounted upon a rear surface portion of the mounting plate 144.

Over-center locking mechanisms 146 have a mounting bracket member 148 fixedly mounted upon the elongated wall member 136, while a stopper member 150 is pivotally mounted upon the mounting bracket member 148. A manually-operated lever mechanism 152 is operatively connected to the stopper member 150 in a well-known manner for moving the stopper member 150 between a fixed or LOCKED position at which the door member 134 is disposed in the illustrated upright position, and a RELEASED position at which the door member 134 is able to be pivotally moved to a lowered position such that access to the cigarette cartons 36 is readily permitted. It is noted that such pivotally mounted access doors 134 are not provided at either one of the cigarette carton loading or cigarette carton unsealing stations 15,16 because sufficient access is already effectively provided for the operator personnel at such cigarette carton loading and cigarette carton unsealing stations 15,16 from positions above each one of such cigarette carton loading and cigarette carton unsealing stations 15,16. In particular, the cigarette cartons 36 can effectively be removed or extracted from such cigarette carton loading and cigarette carton unsealing stations 15,16 simply by lifting the same vertically upwardly with respect to the various operational or processing implements disposed at the cigarette carton loading and cigarette carton unsealing stations 15,16. It is likewise noted that the pivotal mounting of the cigarette carton top flap member opening mechanisms or plow members 126-U,126-D, upon the shuttle or slide mechanism 130 by means of the hinge mechanisms 128, at the two-stage cigarette carton top flap opening station 18 permits such cigarette carton top flap member opening mechanisms or plow members 126-U, 126-D to be pivoted upwardly so as to similarly facilitate access by operator personnel to the cigarette cartons 36 as may be necessary.

Figure 6:
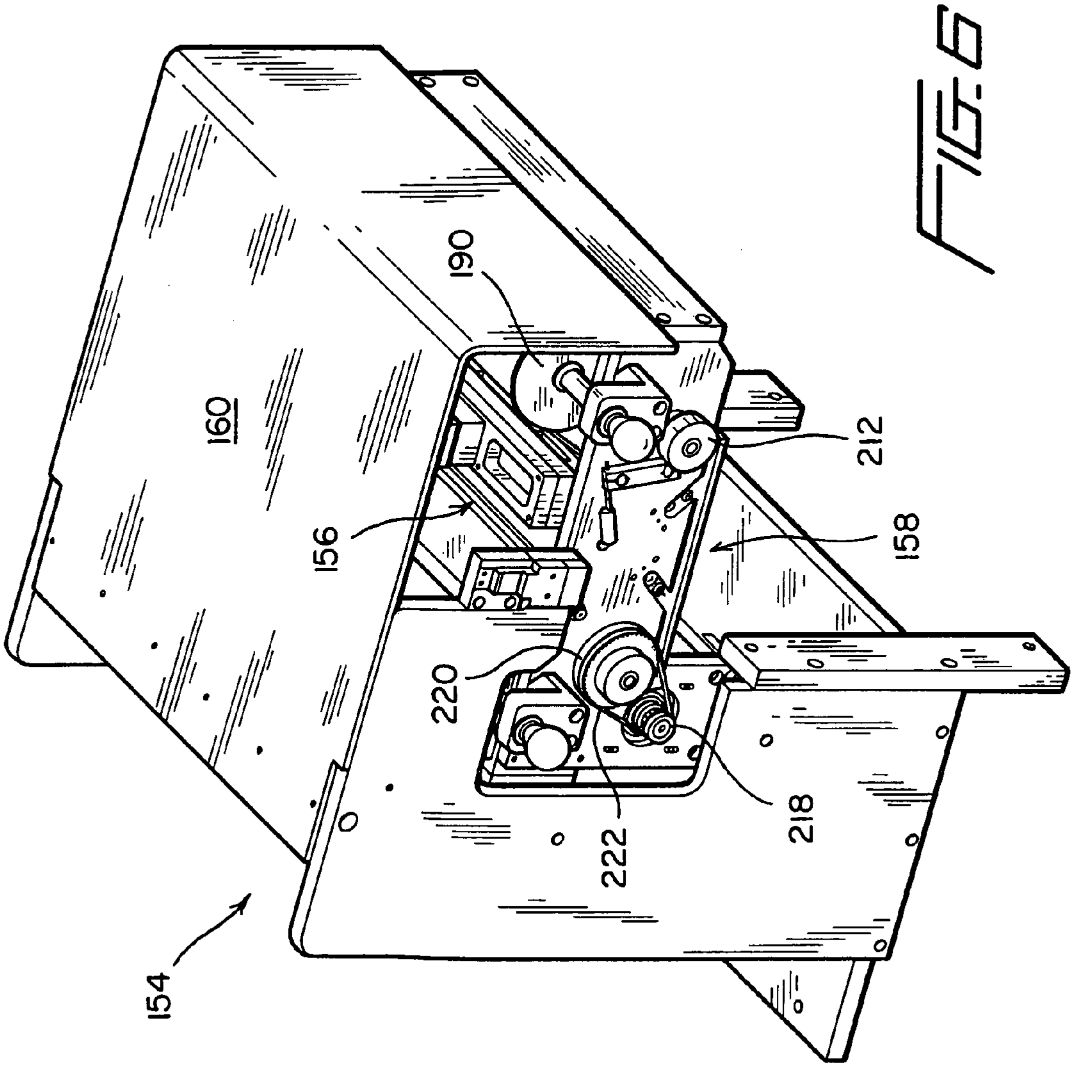
FIG. 6 is a perspective view of the central tax stamp application station, of the processing or operational line of the new and improved synchronized central stamp applicator machine, apparatus, or system of the present invention as disclosed within FIG. 1, at which tax stamps are applied to each one of the individual cigarette packages disposed within each one of the cigarette cartons.
Figure 8:
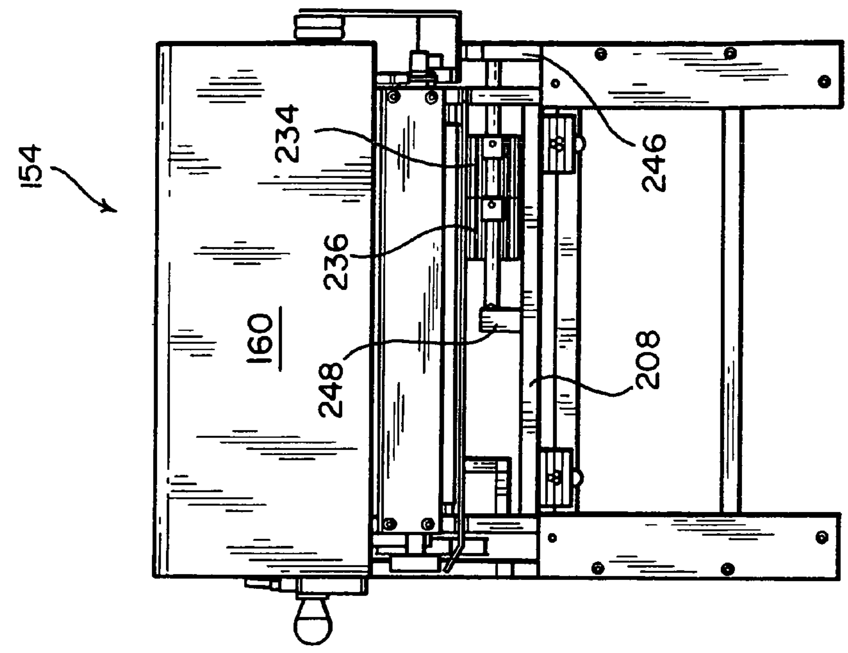
FIG. 8 is a front elevational view of the central tax stamp application station as disclosed within FIGS. 6 and 7 showing the relative disposition of the tax stamp head assembly with respect to the waxed tax stamp paper or foil assembly.
Figure 7:
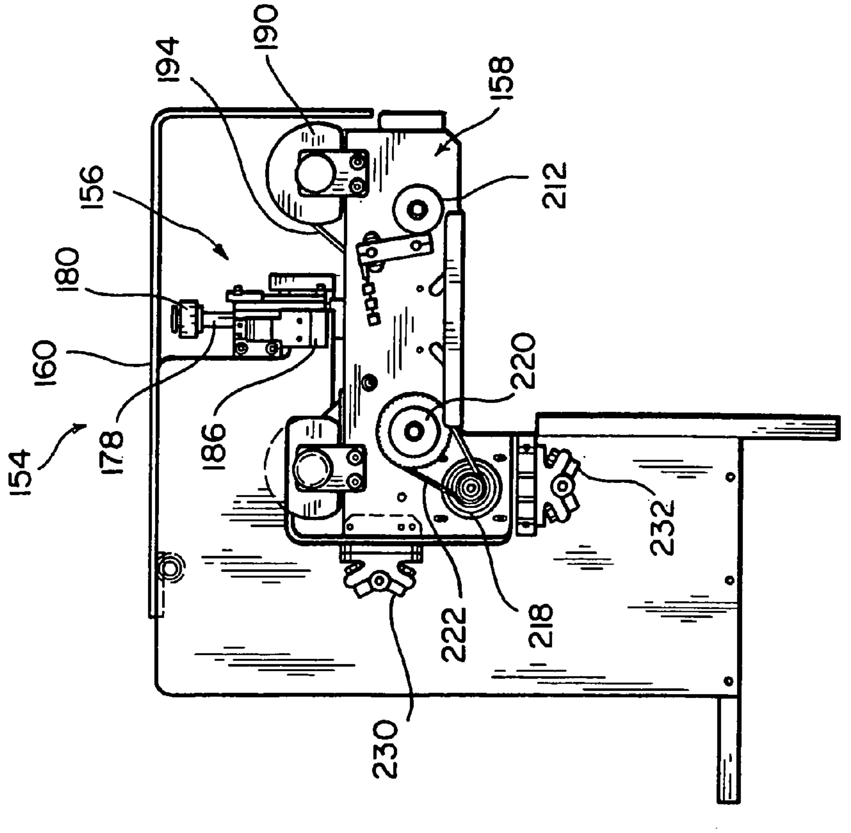
FIG. 7 is a side elevational view of the central tax stamp application station as disclosed within FIG. 6 showing the relative disposition of the tax stamp head assembly with respect to the waxed tax stamp paper or foil assembly.
Figure 10:
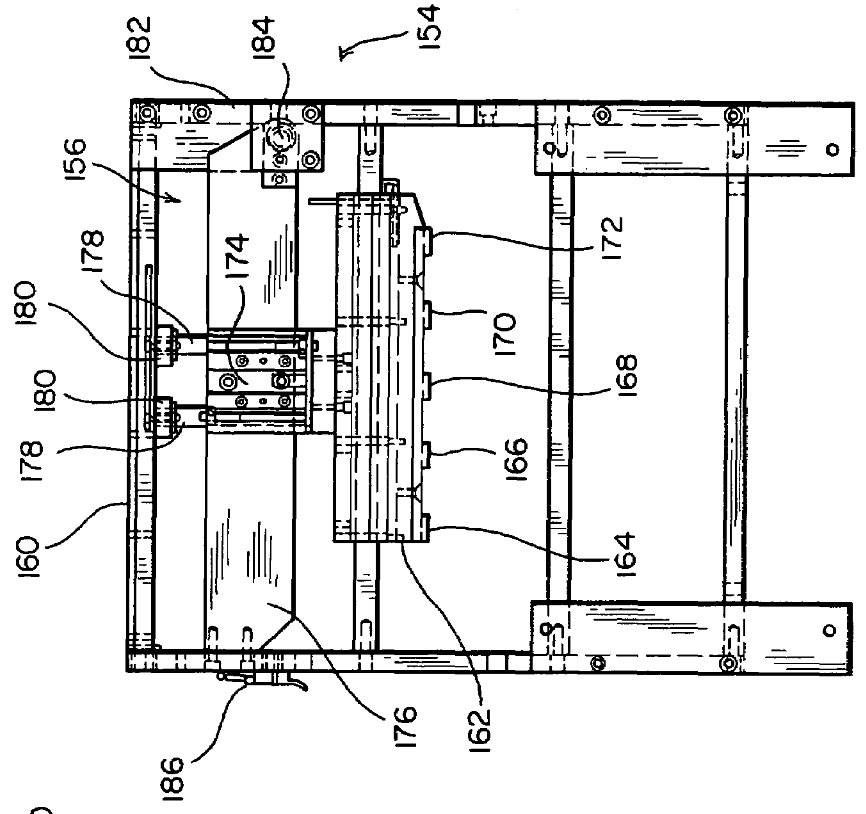
FIG. 10 is a front elevational view of the tax stamp head assembly as disclosed within FIGS. 7 and 9 showing the details of the vertical slide mechanism for the tax stamp head assembly in order to move the tax stamp application shoes of the tax stamp head assembly toward and away from the waxed tax stamp paper or foil of the waxed tax stamp paper or foil assembly so as to apply tax stamps to the cigarette packages.
Figure 9:
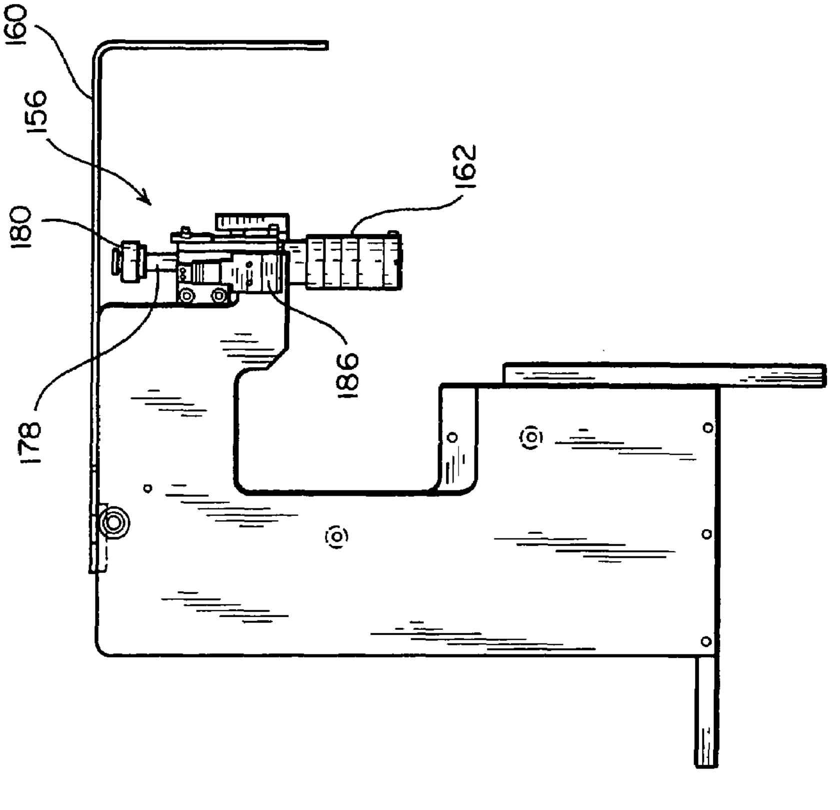
FIG. 9 is a side elevational view of the tax stamp head assembly of the central tax stamp application station as disclosed within FIG. 7.

With reference now being specifically made to FIGS. 6-15, the details of the central cigarette package tax stamp applicator assembly, generally indicated by the reference character 154, and as disposed at the tax stamp application station 20, will be described. More particularly, it is to be appreciated that in accordance with the unique and novel teachings and principles of the present invention, the central cigarette package tax stamp applicator assembly 154, as particularly disclosed within FIGS. 6-8, is seen to comprise a tax stamp applicator head assembly, which is generally indicated by the reference character 156 and is disclosed within FIGS. 9 and 10, and a waxed tax stamp paper or foil assembly which is generally indicated by the reference character 158 and is disclosed within FIGS. 11-15. As disclosed within FIGS. 6-10, the central cigarette package tax stamp applicator assembly 154 is seen to comprise an external or outer housing or casing 160, and as can best be appreciated from FIGS. 6 and 7, when the tax stamp applicator head assembly 156 and the waxed tax stamp paper or foil assembly 158 are assembled within the central cigarette package tax stamp applicator assembly 154, the tax stamp applicator head assembly 156 is disposed above the waxed tax stamp paper or foil assembly 158 such that tax stamp application implements of the tax stamp applicator head assembly 156 can operatively interact with the waxed tax stamp impressions present upon the waxed tax stamp paper or foil of the waxed tax stamp paper or foil assembly 158.

More particularly, as can best be appreciated from FIGS. 6,7,9, and 10, the tax stamp applicator head assembly 156 is seen to comprise a stamping iron 162 which substantially comprises a rectangular block. The stamping iron 162 is used to apply tax stamps onto upper surface portions of each one of the individual cigarette packages disposed within the cigarette cartons 36, and it is seen that the bottom or lower surface of the stamping iron 162 is provided with a plurality of longitudinally spaced stamping iron shoes 164,166,168,170,172. The stamping iron 162 is fixedly attached to a slide mechanism 174 which is mounted for vertical reciprocating movements upon a mounting plate 176, and in this manner, other than the vertical movements of the stamping iron 162, as permitted and controlled by means of the slide mechanism 174, the stamping iron 162 is fixed in position with respect to the tax stamp application station 20. Accordingly, the stamping iron 162 does not undergo any longitudinal or transverse movements with respect to the tax stamp application station 20, and therefore, each one of the plurality of stamping iron shoes 164,166,168,170,172 is disposed at a fixed longitudinal position with respect to the tax stamp application station 20. Consequently, it can be readily appreciated that when any one of the cigarette cartons 36 is indexed to and disposed at the predetermined location within the tax stamp application station 20 at which the cigarette packages contained therein are supposed to have tax stamps applied thereto, each one of the stamping iron shoes 164,166, 168,170,172 will engage a predetermined, and in particular, a centralized, portion of each cigarette package of the particular cigarette carton 36 upon which a tax stamp can be impressed and applied.

The slide mechanism 174 may be pneumatically driven in accordance with suitable signals received from the program logic controller (PLC) 46, and a pair of guide rods 178,178, fixedly connected to the stamping iron 162, are mounted within the mounting plate 176 for guiding the movement of the stamping iron 162 as the same undergoes its vertical reciprocating movements between its raised DISENGAGED state or position, with respect to the waxed tax stamp paper or foil, and its lowered ENGAGED state or position with respect to the waxed tax stamp paper or foil. The upper end portions of the guide rods 178,178 have stopper members 180, 180 respectively mounted thereon for assisting in defining the upper and lower limits of the reciprocating movements of the stamping iron 162. It is further seen that the mounting plate 176, and therefore the stamping iron 162, is mounted upon an upper framework portion 182 of the central cigarette package tax stamp applicator assembly 154 which is capable of undergoing upward pivotal movement as permitted by means of a pivot shaft assembly 184 mounted within the downstream end of the central cigarette package tax stamp applicator assembly 154. A latch mechanism 186 is mounted upon the upstream end of the central cigarette package tax stamp applicator assembly 154, and in this manner, when the latch mechanism 186 is released, the stamping iron 162 is permitted to be pivoted upwardly so as to remove the same from within the vicinity of any cigarette carton 36 disposed at the tax stamp application station 20, so as to effectively move the stamping iron 162 to a position remote from the cigarette carton 36 disposed at the tax stamp application station 20, and to thereby facilitate access to the cigarette carton 36 disposed at the tax stamp application station 20 as may be necessary.

Figure 11:
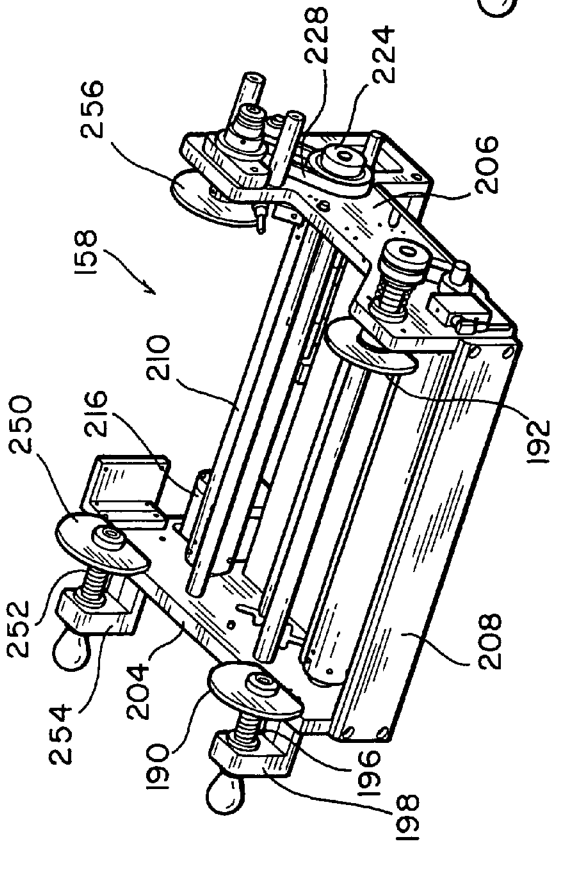
FIG. 11 is a perspective view of the waxed tax stamp paper or foil assembly as disclosed within FIGS. 6 and 7 showing the various components thereof.
Figure 14:
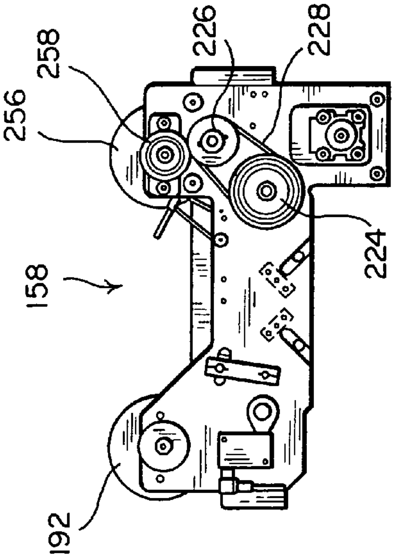
FIG. 14 is a right side elevational view of the waxed tax stamp paper or foil assembly as disclosed within FIGS. 12 and 13 showing the various components thereof.
Figure 13:
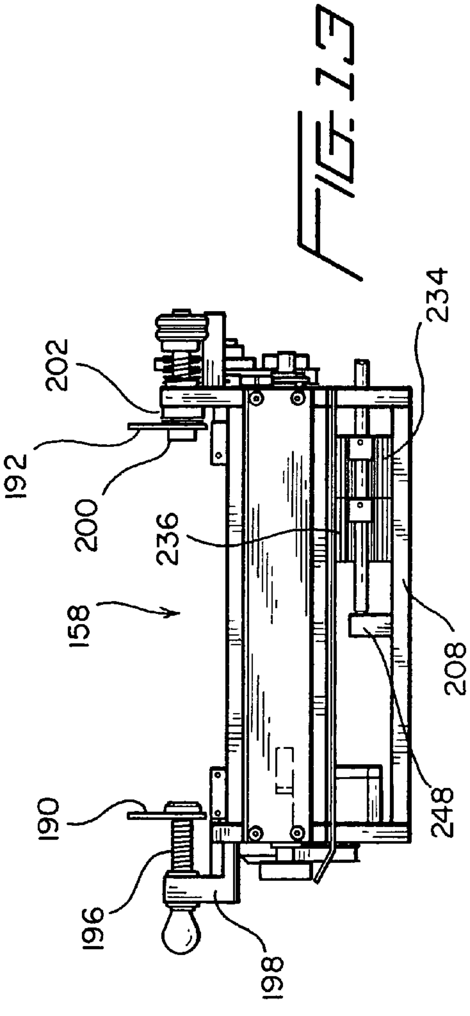
FIG. 13 is a front elevational view of the waxed tax stamp paper or foil assembly as disclosed within FIG. 11 showing the operative connection thereof to the power cylinder mechanism for indexably moving the waxed tax stamp paper or foil assembly between its three indexed positions by means of which the various thermally activatable waxed tax stamps are able to be exposed to the tax stamp application shoes of the tax stamp head assembly.
Figure 12:
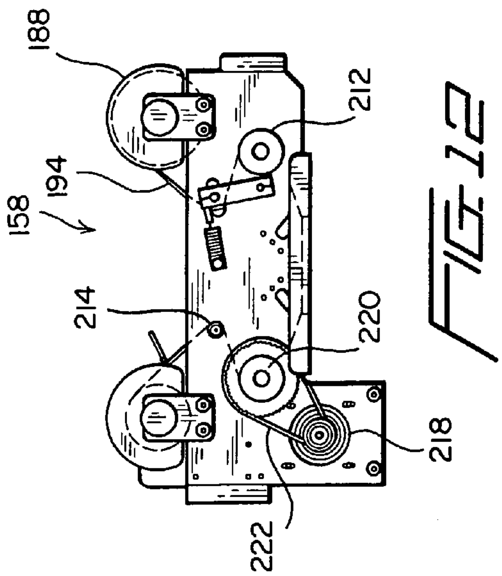
FIG. 12 is a left side elevational view of the waxed tax stamp paper or foil assembly as disclosed within FIG. 11 showing the various components thereof.

With reference now being made to FIGS. 11-15, the waxed tax stamp paper or foil assembly 158 will be described. The tax stamps are provided as waxed impressions upon a supply roll 188 of foil or paper, as best seen in FIG. 12, and opposite ends of the paper or foil supply roll 188 are adapted to be interposed between a pair of disks 190,192 which form a paper holder assembly as may best be seen in FIG. 11. The waxed tax stamps are effectively transferred from the waxed tax stamp paper 194 onto the upper surface portions of the individual cigarette packages contained within each cigarette carton 36 when the stamping iron shoes 164,166,168,170,172 come into contact with the waxed tax stamps and are appropriately energized so as to effectively melt the waxed tax stamps. The disk 190 is mounted upon a spindle 196 which is rotatably mounted in a spring-biased manner within a bearing block assembly 198 so as to permit the supply roll 188 of waxed tax stamp paper to be inserted between the disks 190, 192 when the disk 190 is effectively moved axially away from or relative to the disk 192 against the spring biasing force, and disk 192 is mounted upon a spindle 200 which is rotatably mounted within another bearing block assembly 202 as best seen in FIG. 13. The bearing block assemblies 198,202 are fixedly mounted upon external surface portions of oppositely disposed end walls 204,206 of a housing or platform assembly 208, and an indexably driven roller 210, as well as a pair of guide or idler rollers 212,214 have their opposite ends rotatably mounted within the end walls 204,206 of the housing or platform assembly 208 so as to extend therebetween.

A servo drive motor assembly 216 is mounted within a rear region of the housing or platform assembly 208 as best seen in FIG. 11, and it is seen that the servo drive motor assembly 216 has a drive pulley 218 operatively associated therewith as can be seen in FIG. 12. A first end of the indexably driven roller 210 has a driven pulley 220 disposed thereon, and a pulley belt 222 drivably interconnects the drive and driven pulleys 218,220. The opposite end of the indexably driven roller 210 is similarly provided with a drive pulley 224 which is rotatably mounted upon the external surface portion of the end wall 206 of the housing or platform assembly 208, and a driven pulley 226, likewise rotatably mounted upon the external surface portion of the end wall 206 of the housing or platform assembly 208, is operatively connected to the indexably driven roller 210, through means of the drive pulley 224, by means of another pulley belt 228 for a purpose which will become clear shortly hereinafter. It is therefore to be noted that when the accessor+y shaft 82 is rotatably driven through one cyclic revolution, a suitable cam member assembly, or the like, disposed upon the accessory shaft 82 will cause a signal to be transmitted to the program logic controller (PLC) 46 whereby the program logic controller (PLC) 46 will initiate the tax stamp application operation or process which includes the transmission of a suitable signal to the servo drive motor 216. The indexably driven roller 210 has a plurality of drive pins, not shown, fixedly mounted upon its opposite ends for drivingly engaging apertures provided within the opposite ends of the waxed tax stamp paper or foil 194 which is disposed upon the supply roll 188 of waxed tax stamp paper rotatably supported upon the spindled disks 190,192. In this manner, when the servo drive motor 216 is indexably activated by means of the program logic controller (PLC) 46, the driven roller 210 will be accordingly index-ably driven so as to effectively indexably advance the sup-ply roll 188 of waxed tax stamp paper or foil whereby new or fresh tax stamp impressions disposed upon the waxed tax stamp paper 194 can be serially presented to the stamping iron shoes 164,166, 168,170,172 as needed or required.

It is to be noted that the tax stamps are effectively preprinted or pre-formed upon the supply roll 188 of waxed tax stamp paper or foil within longitudinally extending rows comprising fifteen tax stamps per row, or in other words, each tax stamp is disposed within a row of tax stamps defining fifteen tax stamp positions. Conventionally, the cigarette cartons 36 are packaged in such a manner that the cigarette packages, disposed inside each one of the cigarette cartons 36, are arranged within an array comprising two rows of cigarette packages, with each row of cigarette packages comprising five cigarette packages. In other words, the cigarette packages are disposed within an array comprising two rows and five columns. Accordingly, the stamping iron 162 is provided with the five stamping iron shoes 164, 166,168,170, 172, and it is noted that the transverse extent of each one of the stamping iron shoes 164,166,168,170,172 is large enough so as to effectively cover or thermally interact with waxed tax stamps disposed within two adjacent rows of stamps upon the waxed tax stamp paper or foil 194 so as to, in turn, apply the stamps to both of the cigarette packages disposed within each one of the five columns of cigarette packages disposed within each one of the cigarette cartons 36. It is further noted that the stamping iron shoes 164,166,168,170,172 are longitudinally spaced from each other, as is clearly seen within FIG. 10, such that when the stamping iron 162 is disposed at its predetermined position at or relative to the cigarette package tax stamp applicator station 20, each one of the stamping iron shoes 164,166,168, 170,172 will respectively thermally engage or interact with every third tax stamp pre-formed or pre-printed upon the waxed tax stamp paper 194.

It has been noted that in accordance with the cigarette package tax stamp applicator machine as disclosed within the aforenoted Chojnacki et al. patent application, the stamping iron is adapted to be linearly moved in a longitudinally oriented mode, and in precisely defined incremental steps in both the upstream or downstream directions, in order to permit the stamping iron shoes thereof to effectively interact with all of the waxed tax stamp impressions disposed upon the waxed tax stamp paper or foil. However, it has also been further noted that in some instances, such a structural system or arrangement can lead to the phenomenon known as "chop-off" wherein, as has been described hereinbefore, the waxed tax stamps are not always applied to central regions of each cigarette package and in fact are often applied to end regions of the cigarette packages such that the cigarette packages only have partial or incomplete tax stamps applied thereto. Consequently, in accordance with the principles and teachings of the present invention, in lieu of indexably moving the stamping iron 162 in precisely defined longitudinally oriented incremental steps, stamping iron 162 is effectively maintained at a fixed position with respect to the tax stamp application station 20, and any particular cigarette carton 36 disposed at the tax stamp application station 20, in connection with both longitudinal and lateral or transverse directional movements, and is only permitted to be undergo vertical movements, with respect to the tax stamp application station 20 and any particular cigarette carton 36 disposed at the tax stamp application station 20, between the aforenoted ENGAGED and DISENGAGED positions.

Concomitantly, in accordance with additional principles and teachings of the present invention, the waxed tax stamp paper or foil assembly 158 is adapted to undergo precisely defined, longitudinally oriented, indexable incremental stepwise movement with respect to the tax stamp applicator head assembly 156. With reference therefore again being made to FIGS. 7,8, and 11-15, in order to achieve the aforenoted precisely defined, longitudinally oriented, indexable and incremental stepwise movement of the waxed tax stamp paper or foil assembly 158 with respect to the tax stamp applicator head assembly 156 so as to effectively expose, in accordance with a longitudinally indexable and incremental mode of operation, the different sets of waxed tax stamps, disposed upon the waxed tax stamp paper or foil 194, to the stamping iron shoes 164,166,168,170,172 of the stamping iron 162, it is seen that the housing or platform assembly 208 of the waxed tax stamp paper or foil assembly 158 is mounted upon a pair of bearing members or pillow blocks 230, 232 as best seen in FIG. 7 such that the entire waxed tax stamp paper or foil assembly 158 will be permitted to undergo longitudinal slidable movement. In addition, as can best be appreciated from FIGS. 8,13, and 15, the means for in fact achieving such precisely defined, longitudinally oriented, indexable and incremental stepwise movement of the waxed tax stamp paper or foil assembly 158 with respect to the tax stamp applicator head assembly 156 is seen to comprise first and second pneumatically-controlled piston-cylinder assemblies 234,236 for in effect achieving a two-stage movement of the waxed tax stamp paper or foil assembly 158 with respect to the tax stamp applicator head assembly 156.

Figure 15:
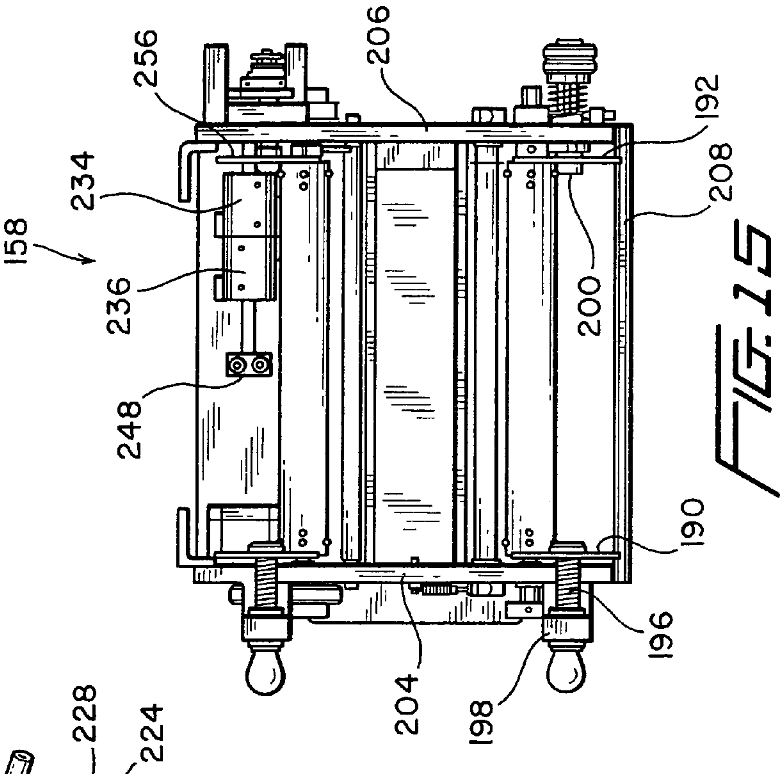
FIG. 15 is a top plan view of the waxed tax stamp paper or foil assembly as disclosed within FIGS. 12-14 showing the various components thereof.
Figure 16A:
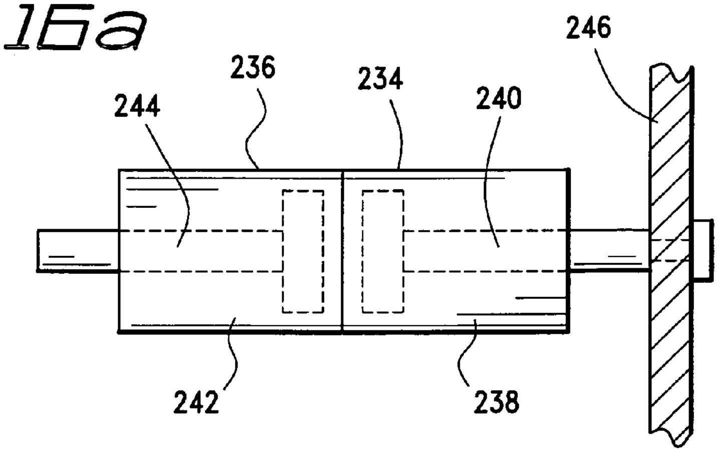
FIGS. 16*a*-16*c* are schematic diagrams illustrating the dual piston-cylinder assembly operatively connected between the tax stamp head assembly and the tax stamp paper or foil assembly for indexably moving the tax stamp paper or foil assembly between individual ones of its three indexable positions.
Figure 16B:
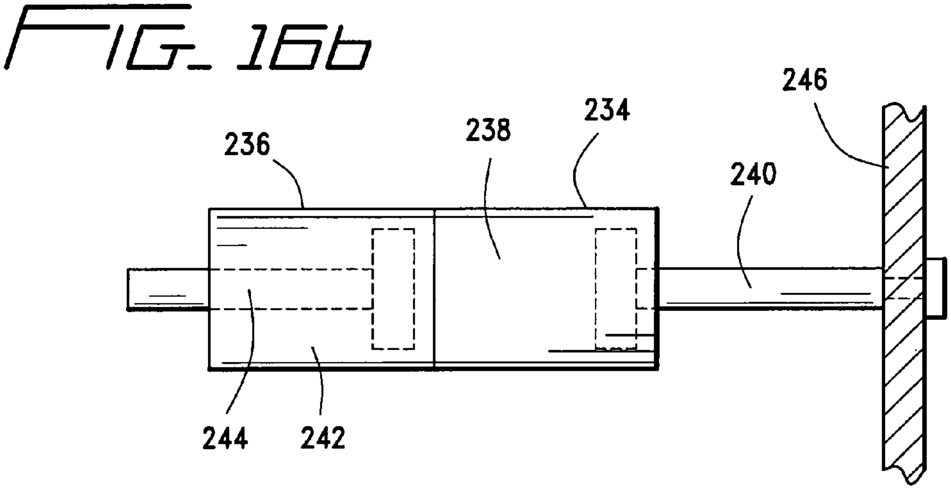
Figure 16C:
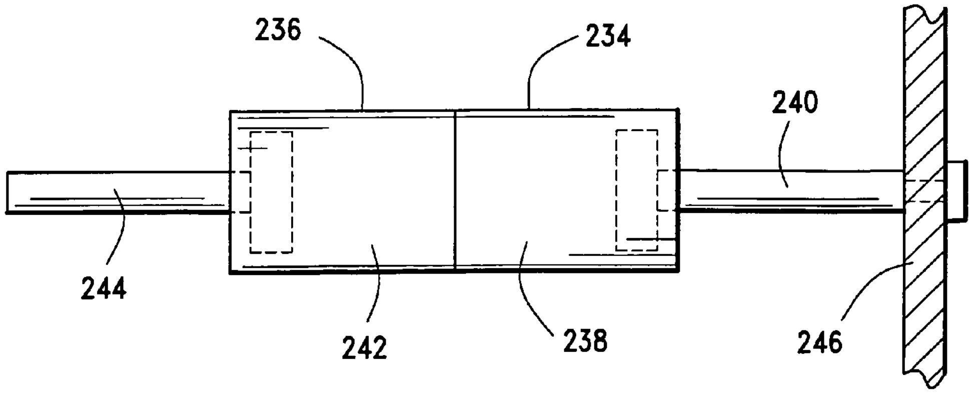

More particularly, with specific reference being additionally made to FIGS. 16*a*-16*c*, it is seen that the first piston-cylinder assembly 234 comprises a first cylinder 238, and a first piston member 240 is disposed internally within the first cylinder 238 in such a manner that the first cylinder 238 is longitudinally movable with respect to the first piston member 240. In a similar manner, the second piston-cylinder assembly 236 comprises a second cylinder 242, and a second piston member 244 is disposed internally within the second cylinder 242 in such a manner that the second piston member 244 is longitudinally movable with respect to the second cylinder 242. Still further, the right end or extremity of the first piston member 240 is fixedly secured to a framework member 246 of the tax stamp applicator assembly 154, as can also be seen in FIG. 8, the left end or extremity of the second piston member 244 is fixedly connected to a mounting bracket 248 which is fixedly secured to the housing or platform assembly 208 of the waxed tax stamp paper or foil assembly 158, as can be seen in FIGS. 8,13, and 15, and the first and second cylinders 238,242 are fixedly connected together at their common end or junction.

Consequently, as may readily be appreciated from the sequential operations as illustrated within FIGS. 16*a*-16*c*, when both of the pneumatic piston-cylinder assemblies 234, 236 are effectively deactivated, as shown in FIG. 16*a*, both of the first and second cylinders 238,244 are disposed in their extreme rightward positions, and the second piston member 244 is likewise disposed in its extreme rightward or retracted position whereby the waxed tax stamp paper or foil assembly 158 will be disposed at its first or extreme rightward position due to the operative interconnection defined between the second piston member 244 and the housing or platform assembly 208 of the waxed tax stamp paper or foil assembly 158 through means of the mounting bracket 248. In a similar manner, when only the pneumatic piston-cylinder assembly 234 is in effect activated, as shown in FIG. 16*b*, both of the first and second cylinders 238,242 are disposed at their extreme leftward positions whereby, due to the fixed interconnection defined between the first and second cylinders 238,242, the waxed tax stamp paper or foil assembly 158 will be disposed at its second or midway position. Lastly, when both of the pneumatic piston-cylinder assemblies 234,236 are in effect activated, as shown in FIG. 16*c*, both of the first and second cylinders 238,242 are maintained at their extreme leftward positions, and in addition, the second piston member 244 is extended toward its extreme leftward position whereby, due to the fixed interconnection defined between the first and second cylinders 238,242, and the fixed interconnection defined between the second piston member 244 and the housing or platform assembly 208 of the waxed tax stamp paper or foil assembly 158 through means of the mounting bracket 248, the waxed tax stamp paper or foil assembly 158 will be disposed at its third or extreme leftward position.

It can therefore be appreciated, in accordance with the foregoing, that when the waxed tax stamp paper or foil assembly 158 is disposed at its first position under the control of the pneumatic piston-cylinder assemblies 234,236 in accordance with suitable control signals received from the program logic controller (PLC) 46, and when the stamping iron 154 is likewise disposed at its proper elevational level, for engaging the cigarette packages disposed within a particular one of the cigarette cartons 36 disposed at the tax stamp application station 20, under the control of the slide mechanism 174 in accordance with a suitable control signal received from the program logic controller (PLC) 46, the stamping iron shoes 164,166,168,170,172 will be positioned so as to thermally engage and interact with those tax stamps, disposed upon the waxed tax stamp paper 194, which are located at positions 1,4,7,10, and 13 of the aforenoted fifteen tax stamp positions. Similarly, when the waxed tax stamp paper or foil assembly 158 is disposed at its second position, the stamping iron shoes 164,166,168,170,172 will be located or positioned so as to thermally engage and interact with those tax stamps, disposed upon the waxed tax stamp paper 194, which are located at positions 2,5,8,11, and 14 of the aforenoted fifteen tax stamp positions, and lastly, when the waxed tax stamp paper or foil assembly 158 is disposed at its third position, the stamping iron shoes 164,166,168,170,172 will be located or positioned so as to thermally engage and interact with those tax stamps, disposed upon the waxed tax stamp paper 194, which are located at positions 3,6,9,12, and 15 of the aforenoted fifteen tax stamp positions. When all of the waxed tax stamps originally located at all of the fifteen tax stamp positions have been transferred to cigarette packages contained within the cigarette cartons 36, the piston-cylinder assemblies 234,236 will of course be again deactivated so as to return the waxed tax stamp paper or foil assembly 158 back to its first position in preparation for the transfer of a new set of waxed tax stamps to additional cigarette packages.

When all of the waxed tax stamps originally located at all of the fifteen tax stamp positions have in fact been transferred to cigarette packages contained within the cigarette cartons 36, the servo drive motor assembly 216 will be accordingly activated by means of the program logic controller (PLC) 46 so as to effectively index the supply roll 188 of waxed tax stamp paper whereby a new or fresh supply of waxed tax stamp impressions can be properly positioned with respect to the stamping iron 154 such that new waxed tax stamps can be transferred to new or additional cigarette packages disposed within an upstream cigarette carton 36 when the same is subsequently disposed at the cigarette package tax stamp applicator station 20. In accordance with such indexed movement or drive of the supply roll 188 of waxed tax stamp paper, it is additionally noted that the cigarette package tax stamp applicator station 20 is also provided with a take-up roll assembly by means of which used or depleted waxed tax stamp paper 194 is effectively collected.

In particular, as can best be appreciated as a result of reference again being made to FIGS. 11,14, and 15, the take-up roll assembly is disclosed as comprising a disk 250, a rotatable spindle 252, and a bearing assembly 254, all of which are structurally similar to the supply roll disk 190, spindle 196, and bearing assembly 198. The opposite end of the take-up roll assembly also comprises a disk 256, which is similar to that of supply roll disk 192, however, it is additionally noted that such disk 256 is operatively connected to suitable gearing 258 which is adapted to be operatively connected to the pulley-driven roller 226 whereby the take-up roll assembly is effectively operatively connected to, and driven by, the servo drive motor 216. Accordingly, as the waxed tax stamp paper 194 is unreeled from the supply roll 188 of waxed tax stamp paper mounted upon disks 190,192, routed around guide roller 212, passed beneath the stamping iron 154, engaged by the drive pins of driven roller 220, and routed around guide roller 214, it can be reeled upon the take-up roll, as a result of the positive drive imparted thereto, such that the used waxed tax stamp paper can be collected and ultimately replaced when, for example, the supply of the waxed tax stamps, originally disposed upon the supply roll 188 of waxed tax stamp paper, has been depleted as a result of all of the waxed tax stamps having been transferred and applied to cigarette packages contained within the cigarette cartons 36.

Figure 17:
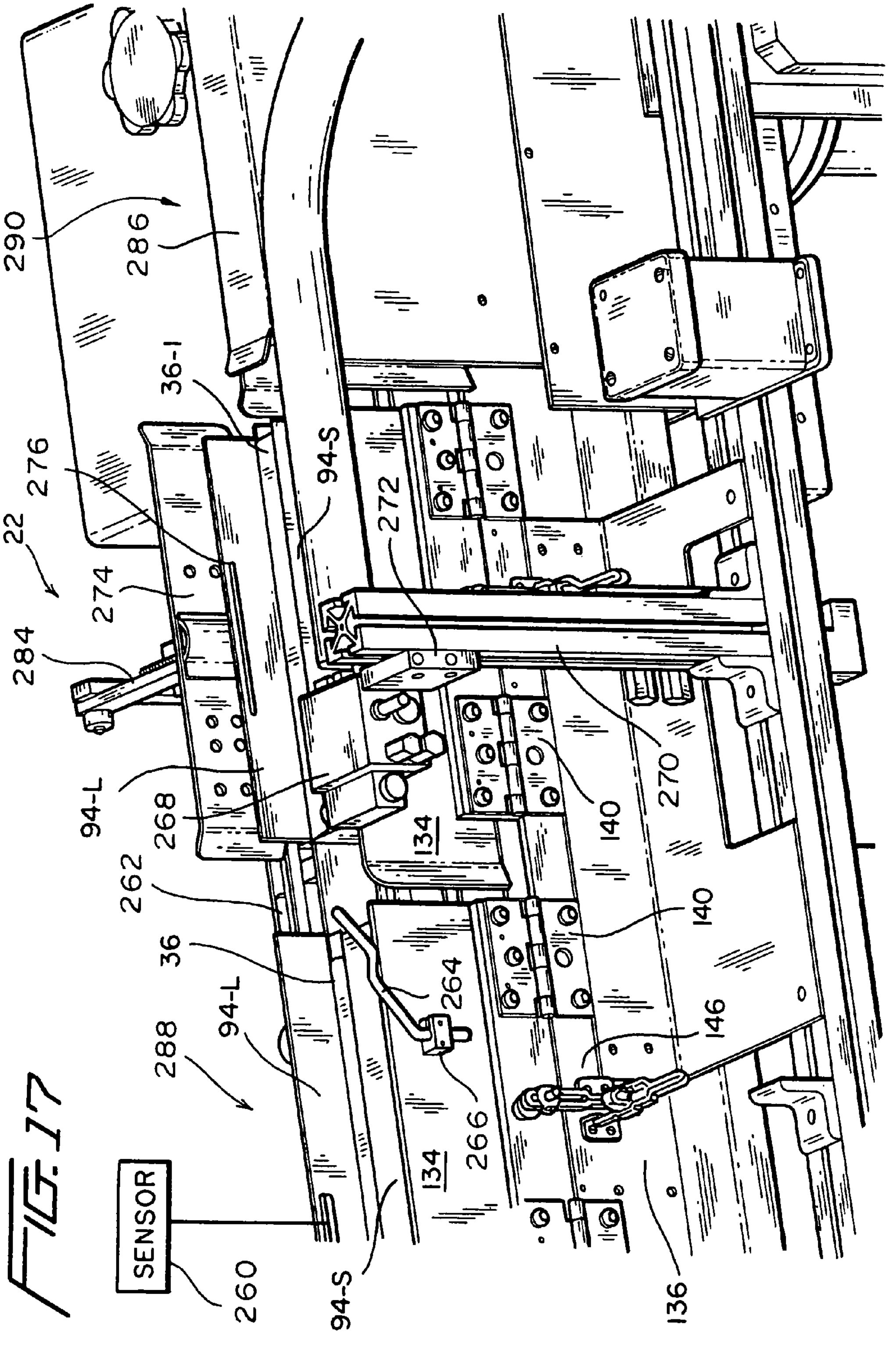
FIG. 17 is a perspective view of the cigarette carton resealing station, of the processing or operational line of the new and improved synchronized central stamp applicator machine, apparatus, or system of the present invention as disclosed within FIG. 1, at which each one of the cigarette cartons, having had the stamps applied to each one of the individual cigarette packages contained therein, now has adhesive applied to an underside portion of the larger top flap member thereof, the top flap members are subsequently folded with respect to each other in an overlapped manner, and the adhesively bonded top flap members are maintained or held in their overlapped position so as to permit the adhesive to cure and set.

With reference lastly being made to FIG. 17, the various operative components of the cigarette carton top flap closing and re-sealing station 22 will now be described in detail. Disposed immediately downstream of the cigarette package tax stamp applicator station 20, and therefore effectively disposed at the upstream entrance end of the cigarette carton top flap closing and re-sealing station 22, there is provided a suitable sensor 260 which detects the presence of a cigarette carton 36 and thereby confirms the fact that the particular cigarette carton 36 has exited the cigarette package tax stamp applicator station 20 and is proceeding downstream toward the cigarette carton top flap closing and re-sealing station 22. While not shown, sensors similar to sensor 260 can likewise be appropriately positioned with respect to the other operational or processing stations for similarly detecting and confirming the fact that a cigarette carton 36 has exited the previous operational or processing station. In this manner, the particular components disposed at a particular one of the operational or processing stations are not needlessly activated if in fact a cigarette carton 36 is not present to be acted upon. Such a scenario can entail, for example, the instance wherein some malfunction or jam occurred along the processing line requiring a particular one of the cigarette cartons 36 to have been previously removed. In connection with the cigarette carton top flap closing and re-sealing station 22, the disposition of the sensor 260 is particularly important because if a cigarette carton 36 was not in fact disposed at the cigarette carton top flap closing and re-sealing station 22, then when the adhesive material, for re-sealing the top flap members 94-L,94-S of the cigarette carton 36, is dispensed, the adhesive material would not in fact be deposited upon the underside surface portion of the larger top flap member 94-L of the cigarette carton 36, whereby the adhesive material would foul some of the other operative components disposed at the cigarette carton top flap closing and resealing station 22.

Having passed the sensor 260 and having therefore been appropriately detected, the cigarette carton 36 is conveyed downstream by means of the transfer mechanism 80 toward the cigarette carton top flap closing and re-sealing station 22. It is to be remembered that since the cigarette carton 36 was just processed within the cigarette package tax stamp applicator station 20 wherein the top flap members 94-L,94-S thereof were disposed at their fully OPENED positions whereby the top flap members 94-L,94-S are extended outwardly away from each other in opposite directions, it is now necessary to fold the top flap members 94-L,94-S inwardly toward each other in preparation for the cigarette carton 36 to be closed and re-sealed. Accordingly, the upstream end portion of the cigarette carton top flap closing and resealing station 22 is provided, upon the rear side thereof, with a first camming rod member 262, only partially visible in FIG. 7, which is adapted to operatively engage the larger top flap member 94-L of the cigarette carton 36 and thereby cause the same to achieve a substantially vertically upright disposition or orientation. In a similar manner, a second camming rod member 264 is fixedly mounted, by means of a suitable mounting bracket 266, upon one of the pivotal access doors 134 so as to operatively engage the smaller top flap member 94-S of the cigarette carton 36 and thereby cause the same to achieve a substantially horizontal disposition or orientation covering the stamped cigarette packages disposed within the cigarette carton 36.

Once the larger and smaller top flap members 94-L, 94-S of the cigarette carton 36 have been disposed in their proper dispositions or orientations, the cigarette carton 36 is now ready to have adhesive applied to the undersurface portion of the larger top flap member 94-L so as to achieve re-sealing of the cigarette carton 36. Accordingly, the cigarette carton top flap closing and re-sealing station 22 further comprises an adhesive or glue gun assembly 268 which is fixedly mounted upon an upstanding standard 270 by means of a suitable mounting bracket 272, and a backup plate 274 against which the larger top flap member 94-L of the cigarette carton 36 is supported during the application of the adhesive material or glue in the form of an adhesive or glue strip 276 onto the undersurface portion of the larger top flap member 94-L by means of the adhesive or glue gun assembly 268. Operation of the adhesive or glue gun assembly 268 is timely controlled by means of the program logic controller (PLC) 46 as a result of a signal transmitted thereto by means of the sensor 260, and as best seen in FIG. 1, the machine, apparatus, or system 10 of the present invention further comprises an adhesive supply tank 278 and an adhesive supply pump 280 by means of which adhesive material or glue is supplied to the adhesive or glue gun assembly 268 through a suitable conduit 282. Still further, a crank arm mechanism 284 is operatively connected through means of a suitable pivotal connection to the back side of the backup plate 274 as can be seen in FIG. 17, and the crank arm mechanism 284 is adapted to be actuated by means of, for example, a sui-able cam mechanism, not shown, disposed upon the accessory shaft 82. Alternatively, the crank arm mechanism 284 may be driven by means of a suitable actuator, not shown, which may be activated by a suitable control signal issued from the program logic controller (PLC) 46.

In either case, the controlled actuation of the crank arm mechanism 284 from the position illustrated in FIG. 17 to its alternative stroke position causes the backup plate 274 to be pivoted downwardly or through an arcuate extent of 90° whereby the backup plate 274 forces the larger top flap member 94-L of the cigarette carton 36 into contact with the previously folded smaller top flap member 94-S of the cigarette carton 36 so as to permit the adhesive material 276, already deposited upon the undersurface portion of the larger top flap member 94-L of the cigarette carton 36 by means of the adhesive or glue gun assembly 268, to adhere to the folded smaller top flap member 94-S thereby achieving complete closure and re-sealing of the cigarette carton 36. The particular adhesive material or glue utilized to re-seal each cigarette carton 36 is relatively fast drying, that is, the adhesive material or glue will dry within a period of 0.5-1.0 seconds, however, to ensure the fact that the adhesive material or glue has sufficient time to properly cure and set, the cigarette carton top flap closing and re-sealing station 22 further comprises a seal maintenance box 286 through which the re-sealed cigarette carton 36 is passed during the next cyclic portion of the entire tax stamp application operation performed in connection with each cigarette carton 36.

The seal maintenance box 286 comprises a substantially hollow container which is open at both opposite ends and which has a substantially rectangular parallelepiped configuration. The upper interior wall surface of the box or container 286 is provided with a leaf spring member, not shown but similar to the leaf spring member 90 disposed at the cigarette carton top flap member unsealing station 16, for engaging the external surface portion of the folded larger top flap member 94-L of the cigarette carton 36 so as to maintain the larger top flap member 94-L adhesively bonded to the smaller top flap member 94-S as the cigarette carton 36 is conveyed through the seal maintenance box or container 286. It is noted that the rear wall, not shown, of the seal maintenance box or container 286 is provided with a suitable slot, or the like, also not shown, for accommodating the pusher or conveyor implements 86 of the chain drive transfer mechanism 80. Once the re-sealed cigarette carton 36 exits the seal maintenance box or container 286, the cigarette carton 36 may then be further conveyed or transferred to another processing station, not shown, for final distribution and transportation.

While the basic overall operation of the new and improved synchronized stamp applicator machine, apparatus, or system 10, constructed in accordance with the principles and teachings of the present invention, is believed to be substantially apparent from the foregoing detailed description, a brief discussion of the operation of the new and improved synchronized stamp applicator machine, apparatus, or system 10 of the present invention is believed to be warranted in order to further emphasize some additional unique and novel operational features of the machine, apparatus, or system 10 of the present invention which may not have become apparent from the foregoing detailed description. For example, while the foregoing detailed description has specifically identified and referred to five operational or processing stations 15,16,18, 20,22 longitudinally spaced along the processing line of the machine, apparatus, or system 10, in reality there are actually eight positions at which each one of the cigarette cartons 36 is stopped during each operative cycle of the overall cigarette carton unsealing, cigarette carton opening, cigarette package stamping, cigarette carton closing, and cigarette carton re-sealing operation. It is also to be emphasized that the entire cigarette carton unsealing, cigarette carton opening, cigarette package stamping, cigarette carton closing, and cigarette carton re-sealing operation is entirely synchronized in that when a particular operation or procedure is being performed upon a particular cigarette carton 36, another particular operation or procedure is being performed upon another cigarette carton 36 at precisely the same time.

Accordingly, a brief description of the operation of the new and improved machine, apparatus, or system 10 of the present invention will now be provided in connection with the processing of eight cigarette cartons 36-1 through 36-8 as disclosed within FIG. 2. As has been previously noted, after the first cigarette carton 36-1 has had its height dimension determined at the cigarette carton sensing and height determination station 14 whereupon the gate members 38,38 are then moved to their OPENED positions so as to permit all of the cigarette cartons 36 to be conveyed toward the cigarette carton loading station 15, the height dimension data of the first cigarette carton 36-1 is transmitted to the program logic controller (PLC) 46 whereby the same controls the elevational disposition of the rail member 62 through means of the servo drive motor and the linear actuator mechanism 76,74. The first cigarette carton 36-1 will now also be disposed at the cigarette carton loading station 15, and when the presence of the first cigarette carton 36-1 has been detected at the cigarette carton loading station 15 by means of the cigarette carton sensor, which is integrally incorporated within the upper surface portion of the rail member 62 at the cigarette carton loading station 15, the transfer mechanism and accessory shaft drive motor 78 is energized. Accordingly, the first cigarette carton 36-1 will now be moved by means of one of the pusher implements 86 of the chain drive transfer mechanism 80 from the cigarette carton loading station 15 to the cigarette carton top flap member unsealing station 16 at which the movement of the chain drive transfer mechanism 80 will be temporarily terminated in order to permit the suction cup assemblies 112-U, 112-D and the cutter blade implement, not shown, to operatively cooperate together in order to sever the original adhesive bond defined between the top flap members 94-L,94-S of the cigarette carton 36-1 whereby the top flap members 94-L,94-S of the cigarette carton 36-1 will now be disposed in their partially opened positions. At the same time that the first cigarette carton 36-1 has been moved by the transfer mechanism 80 to the cigarette carton top flap member unsealing station 16, the second cigarette carton 36-2 has also been moved by means of the conveyor belts 24,24 to the cigarette carton loading station 15.

It is to be noted that the chain drive transfer mechanism 80 and the accessory shaft 82 are constantly driven by means of the drive motor 78 and transmission 84, however, the various operative implements disposed at each operational or processing station 16-22 is in effect intermittently driven or actuated by suitable cam means, switches, sensors, or the like, operatively associated with the accessory drive shaft 82. In addition, and in a similar manner, the chain drive transfer mechanism 80 has a suitable variable speed drive mechanism operatively connected thereto or associated therewith such that the transfer mechanism 80, and therefore each cigarette carton 36, can intermittently or periodically undergo a cigarette carton movement or transfer cycle, by means of which the cigarette cartons 36 are transferred or conveyed from one cyclic position, or operational or processing station, to another cyclic position, or operational or processing station, which comprises an initial acceleration from its stopped state, a brief operation at a constant velocity, and final deceleration to its stopped state. Such a variable drive mechanism may comprise any conventional drive mechanism, such as, for example, a Geneva drive system, or the like.

Continuing further, after the adhesive bond upon the first cigarette carton 36-1 has been severed at the cigarette carton top flap member unsealing station 16, the first cigarette carton 36-1 is moved to and stopped at the first stage position of the cigarette carton opening station 18 as illustrated within FIGS. 4 and 5*a* whereby the first outer or larger top flap member 94-L is moved to its fully OPENED position by means of the upstream top flap opening mechanism or plow member 126-U, while the second cigarette carton 36-2 is now disposed at the cigarette carton top flap member unsealing station 16, and the third cigarette carton 36-3 is disposed at the cigarette carton loading station 15. Continuing further, in accordance with the next cyclic movement of the cigarette cartons 36, the first cigarette carton 36-1 will now be moved to the second stage position of the cigarette carton opening station 18 so as to have the second inner or smaller flap member 94-S moved to its fully OPENED position by means of the downstream top flap opening mechanism or plow member 126-D, the second cigarette carton 36-2 is now disposed at the first stage position of the cigarette carton opening station 18, the third cigarette carton 36-3 is disposed at the cigarette carton top flap member unsealing station 16, and the fourth cigarette carton 36-4 is disposed at the cigarette carton loading station 15.

After the first cigarette carton 36-1 has had its top flap members 94-L,94-S moved to their fully OPENED positions with respect to each other, the first cigarette carton 36-1 is moved to the cigarette package stamp applicator station 20 so as to have the tax stamps applied to the individual cigarette packages contained within the first cigarette carton 36-1, the second cigarette carton 36-2 is simultaneously moved through the second stage position of the cigarette carton top flap opening station 18, the third cigarette carton 36-3 is now disposed at the first stage position of the cigarette carton top flap opening station 18, the fourth cigarette carton 36-4 is disposed at the cigarette carton top flap member unsealing station 16, and the fifth cigarette carton 36-5 is disposed at the cigarette carton loading station 15. Subsequently, upon completion of the application of the tax stamps to the individual cigarette packages contained within the first cigarette carton 36-1, the first cigarette carton 36-1 is conveyed, during the next cyclic movement of the transfer mechanism 80, to and stopped at what may be termed a cigarette carton sensing and top flap orientation position 288 as illustrated in FIG. 17. This is the position at which the sensor 260 detects and confirms the presence of the cigarette carton 36-1 as the same has exited from the cigarette package stamp applicator station 20 so as to subsequently permit activation of the adhesive material or glue gun assembly 268.

In addition, it is noted that the smaller top flap member 94-S has been folded over the cigarette packages contained within the cigarette carton 36-1, and that the larger top flap member 94-L is disposed in a vertically upright orientation, or in other words is disposed at an angle of 90° with respect to the folded smaller top flap member 94-S. This is important because when the first cigarette carton 36-1 is subsequently conveyed through the cigarette carton top flap closing and re-sealing station 22, the larger top flap member 94-L need only be moved 90° from its adhesive application position to its folded and sealed position with respect to the previously folded smaller top flap member 94-S as opposed to having to be moved through an angular extent of 180° as is conventionally required. It is of course to be noted further that while the first cigarette carton 36-1 is disposed at the cigarette carton sensing position 288, the second cigarette carton 36-2 is disposed at the cigarette package stamp applicator station 20, the third cigarette carton 36-3 has been simultaneously moved through the second stage position of the cigarette carton top flap opening station 18, the fourth cigarette carton 36-4 is now disposed at the first stage position of the cigarette carton top flap opening station 18, the fifth cigarette carton 36-5 is disposed at the cigarette carton top flap member unsealing station 16, and the sixth cigarette carton 36-6 is disposed at the cigarette carton loading station 15.

Continuing still further, during the next cyclic movement of the cigarette cartons 36 through the operational or processing line of the machine, apparatus, or system 10 of the present invention, the first cigarette carton 36-1 will be moved through the cigarette carton top flap closing and re-sealing station 22. It is to be particularly noted, appreciated, and understood that, in accordance with the unique and novel principles and teachings of the present invention, as the first cigarette carton 36-1 is moved through the cigarette carton top flap closing and re-sealing station 22, as illustrated within FIG. 17, that is, during such a single operative cycle of the machine, apparatus, or system 10 of the present invention, the larger top flap member 94-L is properly positioned at its 90° orientation in order to receive the application of the adhesive material or glue to the undersurface or interior surface portion thereof, the adhesive material or glue is in fact applied to the undersurface or interior surface portion of the larger top flap member 94-L of the cigarette carton 36-1, and the larger top flap member 94-L of the cigarette carton 36-1 is folded over onto the upper external surface portion of the previously folded smaller top flap member 94-S. This series of operations or procedures within a single operational cycle is critically important and represents a significant departure from conventional operational or processing techniques performed within conventional tax stamp applicator machines, apparatus, or systems.

More particularly, in view of the fact that, if some malfunction occurs within the machine, apparatus, or system 10 of the present invention, which would otherwise prevent, for example, the cigarette cartons 36 from being further moved from one operational or processing station to another operational or processing station, then in accordance with the operational or processing techniques characteristic of the machine, apparatus, or system 10 of the present invention, the cigarette cartons 36 will nevertheless have had the adhesive or glue material 276 applied thereto, and the cigarette cartons 36 will also be able to be closed and sealed. Conventionally, this series of operations or procedures have not been completed within a single cycle whereby if the cigarette cartons 36 were not able to be moved from one operational or processing station due to a systemic malfunction, then cigarette cartons might be present with adhesive applied thereto, however, the cigarette cartons will not have been closed and sealed whereby the adhesive material or glue will cure, dry, and set thereby fouling the same in connection with subsequent processing. It is of course also to be noted that while the first cigarette carton 36-1 is having the adhesive material or glue applied to its larger top flap member 94-L, and being subsequently closed and sealed, at the cigarette carton top flap closing and re-sealing station 22, the second cigarette carton 36-2 is disposed at the cigarette carton sensing position 272, the third cigarette carton 36-3 is disposed at the cigarette package stamp application station 20, the fourth cigarette carton 36-4 has been simultaneously moved through the second stage position of the cigarette carton top flap opening station 18, the fifth cigarette carton 36-5 is now disposed at the first stage position of the cigarette carton top flap opening station 18, the sixth cigarette carton 36-6 is disposed at the cigarette carton top flap member unsealing station 16, and the seventh cigarette carton 36-7 is disposed at the cigarette carton loading station 15.

Lastly, after the first cigarette carton 36-1 has had the adhesive material or glue 276 applied to the under-surface portion of the larger top flap member 94-L, and after the larger top flap member 94-L has been closed to its overlapped position with respect to the smaller top flap member 94-S, the first cigarette carton 36-1 is cyclically moved downstream to and stopped at what may be termed a resealed cigarette carton curing position 290 which is also illustrated within FIG. 17. At this position, as has been noted hereinbefore, the re-sealed cigarette carton 36-1 is maintained in its closed position by means of the tubular seal maintenance box or container 286 so as to ensure the fact that the adhesive material or glue 276 properly cures and sets whereby the cigarette carton 36-1 will in fact be closed and re-sealed. At this point in time, it is of course also noted that the second cigarette carton 36-2 will be disposed at the cigarette carton top flap closing and resealing station 22, the third cigarette carton 36-3 will be disposed at the cigarette carton sensing position 288, the fourth cigarette carton 36-4 will be disposed at the cigarette package stamp application station 20, the fifth cigarette carton 36-5 has been simultaneously moved through the first stage of the cigarette carton top flap opening station 18, the sixth cigarette carton 36-6 is now disposed at the second stage position of the cigarette carton top flap opening station 18, the seventh cigarette carton 36-7 is disposed at the cigarette carton top flap member unsealing station 16, and the eighth cigarette carton 36-8 is disposed at the cigarette carton loading station 15.

At this point in time, the processing of the first cigarette carton 36-1 is entirely complete, and accordingly, during the next cyclic movement of the cigarette cartons 36, the first cigarette carton 36-1 will be discharged from the seal maintenance box or container 286 so as to be processed further, for example, for transportation and distribution, while the second cigarette carton 36-2 will be disposed at the re-sealed cigarette carton curing position 290, the third cigarette carton 36-3 will be disposed at the cigarette carton top flap closing and re-sealing station 22, the fourth cigarette carton 36-4 will be disposed at the cigarette carton sensing position 288, the fifth cigarette carton 36-5 will be disposed at the cigarette package stamp application station 20, the sixth cigarette carton 36-6 has been simultaneously moved through the second stage of the cigarette carton top flap opening station 18, the seventh cigarette carton 36-7 is now disposed at the first stage position of the cigarette carton top flap opening station 18, the eighth cigarette carton 36-8 is disposed at the cigarette carton top flap member unsealing station 16, and the ninth cigarette carton 36-9 is disposed at the cigarette carton loading station 15.

This completes the entire operational cycle in connection with the cigarette cartons 36, and accordingly, a new batch of cigarette cartons 36 can be processed. It is to be remembered that as long as any new or successive cigarette cartons 36 have the same height dimension as that of the previously processed or scanned cigarette carton 36, the successive cigarette cartons 36 need not be scanned so as to have their height dimensions deter-mined. If a new batch of cigarette cartons 36 is to be processed, then the delay in loading the new cigarette cartons 36 onto the infeed conveyor table 26 is sufficient for the sensor, disposed at the cigarette carton loading station 15, to detect the absence of a cigarette carton 36 whereby the same terminates operation of the transfer mechanism and accessory shaft drive motor 78 and also sends an appropriate signal to the program logic controller (PLC) 46 for resetting the gate mechanisms 38,38.

Thus, it may be seen that in accordance with the principles and teachings of the present invention, there has been disclosed a machine, apparatus, or system, and a method of operating the same, whereby tax stamps can be automatically applied to individual cigarette packages disposed within cigarette cartons, which may be manufactured by different manufacturers and therefore may have different height dimensions, as a result of the various implements disposed at the cigarette carton unsealing, cigarette carton flap opening, cigarette package tax stamp application, and cigarette carton closing and re-sealing stations being automatically elevationally adjusted by means of a single servo drive motor and linear actuator mechanism. In addition, the stamping iron for performing the tax stamp application and transfer procedure is maintained longitudinal stationary while the waxed tax stamp paper or foil is indexably moved in the longitudinal direction so as to prevent the tax stamps from being applied to portions of the cigarette packages other than the central regions thereof. Still further, the two-stage cigarette carton top flap member opening mechanism ensures the fact that each one of the outer, larger and inner, smaller carton flap members is in fact properly moved to their respective fully OPENED positions. Still further, the adhesive or glue application to the cigarette carton larger top flap member, and the closing of the larger top flap member, is achieved within a single operative cycle, and still further, pivotal access doors are provided at the various operational or processing stations so as to rapidly facilitate the alleviation of any jamming of any one of the cigarette cartons which may occur along the operational or processing line.

Obviously, many variations and modifications of the present invention are possible in light of the above teachings. It is therefore to be understood that within the scope of the appended claims, the present invention may be practiced otherwise than as specifically described herein.

What is claimed as new and desired to be protected by Letters Patent of the United States of America, is:

1. Apparatus for applying tax stamps onto cigarette packages disposed within cigarette cartons which have predeterminedly different height dimensions, comprising:

a plurality of operational stations, longitudinally spaced from each other along a longitudinally extending processing line, respectively comprising a plurality of operational components for respectively performing a plurality of operations upon each one of a plurality of cigarette cartons having the predeterminedly different height dimensions, and comprising at least a cigarette carton opening station at which top flap members of each cigarette carton are moved to an OPENED position in preparation for having tax stamps applied to the cigarette packages contained within each cigarette carton, a tax stamp application station at which tax stamps are applied to the cigarette packages contained within each one of the cigarette cartons, and a cigarette carton closing station at which the top flap members of each cigarette carton are moved to a CLOSED position after the tax stamps have been applied to the cigarette packages contained within each one of the cigarette cartons;

means defining a support surface, extending along said longitudinally extending processing line, upon which the plurality of cigarette cartons, having the predeterminedly different height dimensions, are adapted to be movably supported;

conveyor means for serially conveying the plurality of cigarette cartons, having the predeterminedly different height dimensions, along said support surface in a predetermined conveying direction and in an intermittent cyclic manner for permitting each one of the plurality of cigarette cartons, having the predeterminedly different height dimensions, to be periodically stopped at each one of said plurality of operational stations such that each one of said plurality of operational components disposed at each one of said plurality of operational stations can respectively perform their operations upon each one of the plurality of cigarette cartons having the predeterminedly different height dimensions;

a contact member movably disposed at a cigarette carton height determination station for movement into engagement with an upper surface portion of a particular one of the plurality of cigarette cartons, having the predeterminedly different height dimensions, when the particular one of the plurality of cigarette cartons, having the predeterminedly different height dimensions, is disposed at said cigarette carton height determination station;

sensor means, disposed at said cigarette carton height determination station, for sensing the distance of said contact member, disposed in contact with the upper surface portion of the particular one of the plurality of different cigarette cartons, having the predeterminedly different height dimensions, which is disposed at said cigarette carton height determination station, from said sensor means and therefore for determining the particular height dimension of the particular one of the plurality of cigarette cartons, having the predeterminedly different height dimensions, disposed at said cigarette carton height determination station, and for generating data indicative of the particular height dimension of the particular one of the plurality of different cigarette cartons, having the predeterminedly different height dimensions, which is disposed at said cigarette carton height determination station;

single actuator means for adjusting the elevational disposition of said means defining said support surface upon which the plurality of cigarette cartons, having the predeterminedly different height dimensions, are adapted to be movably supported as the plurality of cigarette cartons, having the predeterminedly different height dimensions, are conveyed along said processing line from one of said plurality of operational stations to another one of said plurality of operational stations; and control means for receiving said height dimension data from said sensor means for determining the particular height dimension of the particular one of the plurality of different cigarette cartons, having the predeterminedly different height dimensions, which is disposed at said cigarette carton height determination station, and for controlling said single actuator means so as to adjust the elevational disposition of said means defining said support surface, upon which the plurality of different cigarette cartons, having the predeterminedly different height dimensions, are adapted to be movably supported as the plurality of different cigarette cartons, having the predeterminedly different height dimensions, are conveyed along said processing line from one of said plurality of operational stations to another one of said plurality of operational stations, in accordance with said height dimension data, as determined by said sensor means disposed at said cigarette carton height determination station, characteristic of the particular one of the plurality of different cigarette cartons, having the predeterminedly different height dimensions, disposed at said cigarette carton height determination station, such that the plurality of different cigarette cartons, having the predeterminedly different height dimensions, are always disposed at predeterminedly correct elevational levels with respect to said plurality of operational components respectively disposed at said plurality of operational stations whereby said operational components respectively disposed at said plurality of operational stations can properly perform their operations upon the plurality of different cigarette cartons, having the predeterminedly different height dimensions, regardless of the particular height dimension of the particular one of the plurality of different cigarette cartons having the predeterminedly different height dimensions;

said tax stamp application station comprising means for holding a roll of tax stamp paper upon which a plurality of tax stamps, disposed within a predetermined row and column array, is disposed; a stamping iron comprising a plurality of longitudinally spaced stamping shoes for engaging predeterminedly spaced ones of the tax stamps disposed within the predetermined row and column array of tax stamps tax stamps disposed upon the roll of tax stamp paper; and means for indexably moving said roll of tax stamp paper in a longitudinal direction, with respect to said cigarette package tax stamp application station and said stamping iron, and in predetermined incremental steps such that said longitudinally spaced stamping shoes can engage predetermined sets of the predeterminedly spaced tax stamps each time said roll of tax stamp paper is incrementally moved one step whereby a predetermined number of the plurality of different cigarette cartons can have tax stamps, from the rows of tax stamps disposed upon the tax stamp paper, applied to their cigarette packages before the tax stamp paper must be advanced so as to present new rows of tax stamps, of the predetermined row and column array of tax stamps, to said stamping shoes of said stamping iron.

2. The apparatus as set forth in claim 1, wherein said tax stamp application station further comprises:

a vertically oriented slide mechanism upon which said stamping iron is disposed for vertical movements with respect to the tax stamp paper between a lowered ENGAGED position at which said stamping shoes are engaged with the tax stamp paper so as to transfer the tax stamps from the tax stamp paper onto the cigarette packages contained within the cigarette cartons, and a raised DISENGAGED position at which said stamping shoes are disengaged from the tax stamp paper so as not to transfer any tax stamps from the tax stamp paper onto the cigarette packages contained within the cigarette cartons.

3. The apparatus as set forth in claim 1, wherein:

said means for indexably moving said roll of tax stamp paper insaid longitudinal direction, with respect to said cigarette package tax stamp application station and said stamping iron, and in predetermined incremental steps, comprises a two-stage piston-cylinder actuation mechanism.

4. The apparatus as set forth in claim 3, wherein said two-stage piston-cylinder actuation mechanism comprises means for indexably moving said roll of tax stamp paper to any one of three separate and distinct positions.

5. The apparatus as set forth in claim 4, wherein said two-stage piston-cylinder actuation mechanism comprises:

a first piston-cylinder actuation mechanism wherein a first piston of said first piston-cylinder actuation mechanism is fixedly connected to a framework member of said tax stamp application station;

a second piston-cylinder actuation mechanism wherein a second piston of said second piston-cylinder actuation mechanism is fixedly connected to a support member of said roll of tax stamp paper, and a second cylinder of said second piston-cylinder actuation mechanism is fixedly connected to a first cylinder of said first piston-cylinder actuation mechanism;

whereby when both of said first and second piston-cylinder actuation mechanisms are deactuated, said support member of said roll of tax stamp paper is disposed at a first position so as to dispose said roll of tax stamp paper at a first position with respect to said stamping shoes of said stamping iron, when said first piston-cylinder actuation mechanism is actuated, said support member of said roll of tax stamp paper is disposed at a second position so as to dispose said roll of tax stamp paper at a second position with respect to said stamping shoes of said stamping iron, and when both of said first and second piston-cylinder actuation mechanism are actuated, said support member of said roll of tax stamp paper is disposed at a third position so as to dispose said roll of tax stamp paper at a third position with respect to said stamping shoes of said stamping iron.

6. Apparatus for applying tax stamps onto cigarette packages disposed within cigarette cartons which have predeterminedly different height dimensions, comprising:

a plurality of operational stations, longitudinally spaced from each other along a longitudinally extending processing line, respectively comprising a plurality of operational components for respectively performing a plurality of operations upon each one of a plurality of cigarette cartons, and comprising at least a cigarette carton opening station at which top flap members of each cigarette carton are moved to an OPENED position in preparation for having tax stamps applied to the cigarette packages contained within each cigarette carton, a tax stamp application station at which tax stamps are applied to the cigarette packages contained within each one of the cigarette cartons, and a cigarette carton closing station at which the top flap members of each cigarette carton are moved to a CLOSED position after the tax stamps have been applied to the cigarette packages contained within each one of the cigarette cartons;

means defining a support surface, extending along said longitudinally extending processing line, upon which the plurality of cigarette cartons, having the predeterminedly different height dimensions, are adapted to be movably supported;

conveyor means for serially conveying the plurality of cigarette cartons, having the predeterminedly different height dimensions, along said support surface in a predetermined conveying direction and in an intermittent cyclic manner for permitting each one of the plurality of cigarette cartons, having the predeterminedly different height dimensions, to be periodically stopped at each one of said plurality of operational stations such that each one of said plurality of operational components disposed at each one of said plurality of operational stations can respectively perform their operations upon each one of the plurality of cigarette cartons having the predeterminedly different height dimensions;

a contact member movably disposed at a cigarette carton height determination station for movement into engagement with an upper surface portion of a particular one of the plurality of cigarette cartons, having the predeterminedly different height dimensions, when the particular one of the plurality of cigarette cartons, having the predeterminedly different height dimensions, is disposed at said cigarette carton height determination station;

sensor means, disposed at said cigarette carton height determination station, for sensing the distance of said contact member, disposed in contact with the upper surface portion of the particular one of the plurality of different cigarette cartons, having the predeterminedly different height dimensions, which is disposed at said cigarette carton height determination station, from said sensor means and therefore for determining the particular height dimension of the particular one of the plurality of cigarette cartons, having the predeterminedly different height dimensions, disposed at said cigarette carton height determination station, and for generating data indicative of the particular height dimension of the particular one of the plurality of different cigarette cartons, having the predeterminedly different height dimensions, which is disposed at said cigarette carton height determination station;

single actuator means for adjusting the elevational disposition of said means defining said support surface upon which the plurality of cigarette cartons, having the predeterminedly different height dimensions, are adapted to be movably supported as the plurality of cigarette cartons, having the predeterminedly different height dimensions, are conveyed along said processing line from one of said plurality of operational stations to another one of said plurality of operational stations; and control means for receiving said height dimension data from said sensor means for determining the particular height dimension of the particular one of the plurality of different cigarette cartons, having the predeterminedly different height dimensions, which is disposed at said cigarette carton height determination station, and for controlling said single actuator means so as to adjust the elevational disposition of said means defining said support surface, upon which the plurality of different cigarette cartons, having the predeterminedly different height dimensions, are adapted to be movably supported as the plurality of different cigarette cartons, having the predeterminedly different height dimensions, are conveyed along said processing line from one of said plurality of operational stations to another one of said plurality of operational stations, in accordance with said height dimension data, as determined by said sensor means disposed at said cigarette carton height determination station, characteristic of the particular one of the plurality of different cigarette cartons, having the predeterminedly different height dimensions, disposed at said cigarette carton height determination station, such that the plurality of different cigarette cartons, having the predeterminedly different height dimensions, are always disposed at predetermin edly correct elevational levels with respect to said plurality of operational components respectively disposed at said plurality of operational stations whereby said operational components respectively disposed at said plurality of operational stations can properly perform their operations upon the plurality of different cigarette cartons, having the pre determinedly different height dimensions, regardless of the particular height dimension of the particular one of the plurality of different cigarette cartons having the predeterminedly different height dimensions;

said cigarette carton opening station comprising a pair of top flap opening mechanisms for individually engaging each one of the top flap members of each one of the plurality of cigarette cartons so as to ensure each one of the top flap members of each one of the plurality of cigarette cartons is in fact properly moved to its OPENED position, wherein said pair of top flap opening mechanisms for individually engaging the top flap members of each one of the plurality of cigarette cartons comprises a pair of plow members which are longitudinally spaced from each other along said longitudinally extending processing line such that when a downstream one of said pair of plow members, as considered in said conveying direction, is operatively engaged with a first one of the cigarette cartons, which has already had a first one of the top flap members moved to its OPENED position by means of an upstream one of said pair of plow members, so as to move the second one of the top flap members of the first one of the cigarette cartons to its OPENED position, said upstream one of said pair of plow members can operatively engage a second one of the cigarette cartons so as to move the first one of the top flap members of the second one of the cigarette cartons to its OPENED position.

7. The apparatus as set forth in claim 6, wherein:

said cigarette carton opening station comprises a two-stage cigarette carton opening station at which each one of the cigarette cartons is respectively cyclically moved by said conveyor means to a first upstream stage of said two-stage opening station, as considered in said conveying direction, at which the first one of the top flap members of each one of the cigarette cartons is moved to its OPENED position by said upstream one of said pair of plow members, and to a second downstream stage of said two-stage cigarette carton opening station at which the second one of the top flap members of each one of the cigarette cartons is moved to its OPENED position by said downstream one of said pair of plow members.

8. The apparatus as set forth in claim 7, further comprising:

a shuttle mechanism, upon which said pair of plow members are mounted, slidably movable in a direction parallel to said processing line so as to facilitate movement of said pair of plow members between a first ENGAGED position, at which said pair of plow members are respectively engaged with the top flap members of each one of the cigarette cartons disposed at said two-stage opening station so as to move the top flap members to their respective OPENED positions, and a second HOME position at which said pair of plow members are respectively disengaged from the top flap members of each one of the cigarette cartons disposed at said two-stage opening station in preparation for movement to said first ENGAGED position for engaging the top flap members of each one of the cigarette cartons disposed at said twostage opening station so as to move the top flap members of each one of the cigarette cartons to their OPENED positions.

9. The apparatus as set forth in claim 7, further comprising:

a cigarette carton top flap member unsealing station, disposed upstream of said cigarette carton top flap opening station as considered in said conveying direction, at which an adhesive bond defined between the top flap members of each cigarette carton is broken such that the top flap members are disposed at unsealed positions with respect to each other.

10. The apparatus as set forth in claim 9, further comprising:

means disposed at said cigarette carton top flap member unsealing station and said first stage of said twostage cigarette carton opening station for respectively causing the first one of the top flap members of each cigarette carton to be raised with respect to the second one of the top flap members of each cigarette carton so as to define a space therebetween within which a cutter implement can be inserted for severing the adhesive bond securing the first and second top flap members of each cigarette carton together, and for causing the second one of the top flap members of each cigarette carton to be raised so as to permit said downstream one of said pair of plow members to be inserted beneath the second one of the top flap members of each one of the cigarette cartons so as to move the second one of the top flap members of each one of the cigarette cartons to its OPENED position.

11. The apparatus as set forth in claim 10, wherein:

said means disposed at said cigarette carton top flap member unsealing station and said first stage of said two-stage cigarette carton opening station for respectively causing the first one of the top flap members of each cigarette carton to be raised with respect to the second one of the top flap members of each cigarette carton, and for causing the second one of the top flap members of each cigarette carton to be raised so as to permit said downstream one of said pair of plow members to be inserted beneath the second one of the top flap members of each one of the cigarette cartons, comprises a pair of vacuum suction cup assemblies.

* * * * *

UNITED STATES PATENT AND TRADEMARK OFFICE

CERTIFICATE OF CORRECTION

PATENT NO. : 7,631,677 B2
APPLICATION NO. : 10/408639
DATED : December 15, 2009
INVENTOR(S) : Andrzej Chojnacki It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 965 days.

Signed and Sealed this

Second Day of November, 2010

David J. Kappos
*Director of the United States Patent and Trademark Office*